United States Patent
Liang

(10) Patent No.: US 9,077,000 B2
(45) Date of Patent: Jul. 7, 2015

(54) THIN FILM BATTERY AND LOCALIZED HEAT TREATMENT

(71) Applicant: Front Edge Technology Inc., Baldwin Park, CA (US)

(72) Inventor: Jiuh-Ming Liang, Hacienda Heights, CA (US)

(73) Assignee: FRONT EDGE TECHNOLOGY, INC., Baldwin Park, CA (US)

(*) Notice: Subject to any disclaimer, the term of this patent is extended or adjusted under 35 U.S.C. 154(b) by 0 days.

(21) Appl. No.: 13/830,550

(22) Filed: Mar. 14, 2013

(65) Prior Publication Data

US 2014/0106216 A1   Apr. 17, 2014

Related U.S. Application Data

(63) Continuation-in-part of application No. 13/434,775, filed on Mar. 29, 2012.

(51) Int. Cl.
| | |
|---|---|
| H01M 4/04 | (2006.01) |
| H01M 4/131 | (2010.01) |
| H01M 4/1391 | (2010.01) |
| H01M 4/66 | (2006.01) |
| H01M 10/052 | (2010.01) |
| H01M 10/058 | (2010.01) |

(52) U.S. Cl.
CPC ........ *H01M 4/0402* (2013.01); *Y10T 29/49115* (2015.01); *H01M 4/131* (2013.01); *Y02E 60/122* (2013.01); *H01M 4/1391* (2013.01); *H01M 4/661* (2013.01); *H01M 10/052* (2013.01); *H01M 10/058* (2013.01); *H01M 2220/30* (2013.01)

(58) Field of Classification Search
None
See application file for complete search history.

(56) References Cited

U.S. PATENT DOCUMENTS

| | | |
|---|---|---|
| 3,375,135 A | 3/1968 | Moulton et al. |
| 3,414,685 A | 12/1968 | Geib et al. |
| 3,530,007 A | 9/1970 | Golubovic |
| 3,844,841 A | 10/1974 | Baker |
| 3,969,142 A | 7/1976 | Greatbatch et al. |
| 3,993,508 A | 11/1976 | Erlichman |
| 4,031,449 A | 6/1977 | Trombly |
| 4,119,769 A | 10/1978 | Schneider et al. |
| 4,233,371 A | 11/1980 | Dorrestijn |

(Continued)

FOREIGN PATENT DOCUMENTS

| | | |
|---|---|---|
| CN | 1661354 A | 8/2005 |
| EP | 0 829 913 A | 3/1998 |

(Continued)

OTHER PUBLICATIONS

Antaya et al. "Preparation and Characterization of LiCoO2 Thin Films by Laser Ablation Deposition", J. Electrochem. Soc., vol. 140, No. 3, Mar. 1993, pp. 575-578.

(Continued)

*Primary Examiner* — Sarah A Slifka
(74) *Attorney, Agent, or Firm* — Ashok K. Janah; Janah & Associates, PC

(57) ABSTRACT

A lithium battery comprises a battery support and a cathode current collector directly on and in contact with the battery support. The cathode current collector is composed of molybdenum and comprises a thickness of at least about 0.01 microns. A cathode is on the cathode current collector, an electrolyte on the cathode, and at least one of an anode or anode current collector on the electrolyte.

9 Claims, 10 Drawing Sheets

(56) References Cited

U.S. PATENT DOCUMENTS

| | | |
|---|---|---|
| 4,279,726 A | 7/1981 | Baird et al. |
| 4,309,494 A | 1/1982 | Stockel |
| 4,421,835 A | 12/1983 | Manassen et al. |
| 4,459,328 A | 7/1984 | Mizuhara |
| 4,543,441 A | 9/1985 | Kumada et al. |
| 4,565,753 A | 1/1986 | Goebel et al. |
| 4,597,844 A | 7/1986 | Hiraki et al. |
| 4,619,865 A | 10/1986 | Keem et al. |
| 4,663,183 A | 5/1987 | Ovshinsky et al. |
| 4,698,256 A | 10/1987 | Giglia et al. |
| 4,714,660 A | 12/1987 | Gates, Jr. |
| 4,725,345 A | 2/1988 | Sakamoto et al. |
| 4,777,090 A | 10/1988 | Ovshinsky et al. |
| 4,871,433 A | 10/1989 | Wagner et al. |
| 4,873,115 A | 10/1989 | Matsumura et al. |
| 4,877,677 A | 10/1989 | Hirochi et al. |
| 4,882,212 A | 11/1989 | SingDeo et al. |
| 4,904,542 A | 2/1990 | Mroczkowski |
| 4,996,079 A | 2/1991 | Itoh |
| 5,019,467 A | 5/1991 | Fujiwara |
| 5,171,413 A | 12/1992 | Arntz et al. |
| 5,197,889 A | 3/1993 | Rizzo et al. |
| 5,240,794 A | 8/1993 | Thackeray et al. |
| 5,249,554 A | 10/1993 | Tamor et al. |
| 5,250,891 A | 10/1993 | Glasgow |
| 5,253,300 A | 10/1993 | Knapp |
| 5,254,415 A | 10/1993 | Williams et al. |
| 5,262,028 A | 11/1993 | Manley |
| 5,330,853 A | 7/1994 | Hofmann et al. |
| 5,338,625 A | 8/1994 | Bates et al. |
| 5,368,939 A | 11/1994 | Kawamura et al. |
| 5,445,906 A | 8/1995 | Hobson et al. |
| 5,478,456 A | 12/1995 | Humpal et al. |
| 5,490,911 A | 2/1996 | Makowiecki et al. |
| 5,498,490 A | 3/1996 | Brodd |
| 5,503,912 A | 4/1996 | Setoyama et al. |
| 5,506,858 A | 4/1996 | Takenaka et al. |
| 5,511,587 A | 4/1996 | Miya et al. |
| 5,512,147 A | 4/1996 | Bates et al. |
| 5,512,387 A | 4/1996 | Ovshinsky |
| 5,516,340 A | 5/1996 | Takeuchi et al. |
| 5,547,767 A | 8/1996 | Paidassi et al. |
| 5,552,242 A | 9/1996 | Ovshinsky et al. |
| 5,554,456 A | 9/1996 | Ovshinsky et al. |
| 5,561,004 A | 10/1996 | Bates et al. |
| 5,597,660 A | 1/1997 | Bates et al. |
| 5,607,789 A | 3/1997 | Treger et al. |
| 5,612,152 A | 3/1997 | Bates et al. |
| 5,629,560 A | 5/1997 | Katsui et al. |
| 5,650,243 A | 7/1997 | Ferment et al. |
| 5,656,364 A | 8/1997 | Rickerby et al. |
| 5,663,183 A | 9/1997 | Frost et al. |
| 5,670,252 A | 9/1997 | Makowiecki et al. |
| 5,670,272 A | 9/1997 | Cheu et al. |
| 5,681,666 A | 10/1997 | Treger et al. |
| 5,700,551 A | 12/1997 | Kukino et al. |
| 5,705,293 A | 1/1998 | Hobson |
| 5,705,297 A | 1/1998 | Warren |
| 5,708,297 A | 1/1998 | Clayton |
| 5,725,909 A | 3/1998 | Shaw et al. |
| 5,786,582 A | 7/1998 | Roustaei et al. |
| 5,814,195 A | 9/1998 | Lehan et al. |
| 5,818,199 A | 10/1998 | Beard |
| 5,824,374 A | 10/1998 | Bradley, Jr. et al. |
| 5,871,865 A | 2/1999 | Barker et al. |
| 5,894,656 A | 4/1999 | Menon et al. |
| 5,932,368 A | 8/1999 | Batawi et al. |
| 5,961,672 A | 10/1999 | Skotheim et al. |
| 5,981,102 A | 11/1999 | Grigg et al. |
| 5,985,485 A | 11/1999 | Ovshinsky et al. |
| 6,017,654 A | 1/2000 | Kumta et al. |
| 6,022,640 A | 2/2000 | Takada et al. |
| 6,039,850 A | 3/2000 | Schulz |
| 6,040,680 A | 3/2000 | Toya et al. |
| 6,046,575 A | 4/2000 | Demuro |
| 6,051,114 A | 4/2000 | Yao et al. |
| 6,118,248 A | 9/2000 | Gartstein et al. |
| 6,146,715 A | 11/2000 | Kim et al. |
| 6,148,503 A | 11/2000 | Delnick et al. |
| 6,168,884 B1 | 1/2001 | Neudecker et al. |
| 6,197,450 B1 | 3/2001 | Nathan et al. |
| 6,217,623 B1 | 4/2001 | Reichert et al. |
| 6,218,049 B1 | 4/2001 | Bates et al. |
| 6,220,765 B1 | 4/2001 | Tatoh |
| 6,227,204 B1 | 5/2001 | Baumann et al. |
| 6,238,847 B1 | 5/2001 | Axtell, III et al. |
| 6,242,129 B1 | 6/2001 | Johnson |
| 6,264,709 B1 | 7/2001 | Yoon et al. |
| 6,280,875 B1 | 8/2001 | Kwak et al. |
| 6,287,711 B1 | 9/2001 | Nieh et al. |
| 6,340,880 B1 | 1/2002 | Higashijima et al. |
| 6,365,010 B1 | 4/2002 | Hollars |
| 6,379,835 B1 | 4/2002 | Kucherovsky et al. |
| 6,387,039 B1 | 5/2002 | Moses |
| 6,387,563 B1 | 5/2002 | Bates |
| 6,398,824 B1 | 6/2002 | Johnson |
| 6,402,796 B1 | 6/2002 | Johnson |
| 6,411,780 B1 | 6/2002 | Maruyama |
| 6,413,645 B1 | 7/2002 | Graff et al. |
| 6,461,757 B1 | 10/2002 | Sasayama et al. |
| 6,472,295 B1 | 10/2002 | Morris et al. |
| 6,517,968 B2 | 2/2003 | Johnson |
| 6,558,836 B1 | 5/2003 | Whitacre et al. |
| 6,632,563 B1 | 10/2003 | Krasnov et al. |
| 6,636,017 B2 | 10/2003 | Zink et al. |
| 6,645,658 B2 | 11/2003 | Morozumi |
| 6,658,124 B1 | 12/2003 | Meadows |
| 6,661,197 B2 | 12/2003 | Zink et al. |
| 6,696,199 B2 | 2/2004 | Yoshida et al. |
| 6,700,766 B2 | 3/2004 | Sato |
| 6,713,987 B2 | 3/2004 | Krasnov et al. |
| 6,780,544 B2 | 8/2004 | Noh |
| 6,805,998 B2 | 10/2004 | Jenson et al. |
| 6,863,699 B1 | 3/2005 | Krasnov et al. |
| 6,866,901 B2 | 3/2005 | Burrows et al. |
| 6,916,679 B2 | 7/2005 | Snyder et al. |
| 6,921,464 B2 | 7/2005 | Krasnov et al. |
| 6,940,988 B1 | 9/2005 | Shennib et al. |
| 6,982,132 B1 | 1/2006 | Goldner et al. |
| 7,037,621 B2 | 5/2006 | Kikuchi et al. |
| 7,056,620 B2 | 6/2006 | Krasnov et al. |
| 7,122,908 B2 | 10/2006 | Jiang et al. |
| 7,131,189 B2 | 11/2006 | Jenson |
| 7,157,187 B2 | 1/2007 | Jenson |
| 7,186,479 B2 | 3/2007 | Krasnov et al. |
| 7,194,801 B2 | 3/2007 | Jenson et al. |
| 7,194,901 B2 | 3/2007 | Silverbrook et al. |
| 7,204,862 B1 | 4/2007 | Zhang |
| 7,276,878 B2 | 10/2007 | Phillips et al. |
| 7,286,479 B2 | 10/2007 | Bragg |
| 7,308,316 B2 | 12/2007 | Schommer |
| 7,359,590 B2 | 4/2008 | Hsu |
| 7,397,118 B2 | 7/2008 | Tominaga |
| 7,494,742 B2 * | 2/2009 | Tarnowski et al. ............ 429/162 |
| 7,501,202 B2 | 3/2009 | Enomoto et al. |
| 7,510,582 B2 | 3/2009 | Krasnov et al. |
| 7,524,577 B2 | 4/2009 | Bates |
| 7,701,176 B2 | 4/2010 | Chen |
| 7,846,579 B2 | 12/2010 | Krasnov et al. |
| 7,862,627 B2 | 1/2011 | Li et al. |
| 7,862,927 B2 | 1/2011 | Krasnov et al. |
| 7,959,769 B2 | 6/2011 | Zhang et al. |
| 8,030,898 B2 | 10/2011 | Okuto |
| 8,168,322 B2 | 5/2012 | Krasnov et al. |
| 8,502,494 B2 | 8/2013 | Nieh et al. |
| 8,628,645 B2 | 1/2014 | Wang et al. |
| 8,679,674 B2 | 3/2014 | Liang et al. |
| 8,728,176 B2 | 5/2014 | Li et al. |
| 8,753,724 B2 | 6/2014 | Nieh et al. |
| 8,864,954 B2 | 10/2014 | Liang et al. |
| 8,865,340 B2 | 10/2014 | Liang et al. |
| 8,870,974 B2 | 10/2014 | Nieh et al. |
| 2001/0007335 A1 | 7/2001 | Tuttle et al. |
| 2001/0041294 A1 | 11/2001 | Chu et al. |

(56) References Cited

U.S. PATENT DOCUMENTS

| | | |
|---|---|---|
| 2001/0052645 A1 | 12/2001 | Op'T Eynde et al. |
| 2002/0001746 A1 | 1/2002 | Jaenson et al. |
| 2002/0004167 A1 | 1/2002 | Jenson et al. |
| 2002/0028384 A1 | 3/2002 | Krasnov et al. |
| 2002/0041930 A1 | 4/2002 | Erdemir et al. |
| 2002/0071989 A1 | 6/2002 | Verma et al. |
| 2002/0100989 A1 | 8/2002 | Jiang et al. |
| 2002/0102400 A1 | 8/2002 | Gorokhovsky et al. |
| 2002/0110733 A1 | 8/2002 | Johnson |
| 2002/0150823 A1 | 10/2002 | Breitkopf et al. |
| 2003/0121142 A1 | 7/2003 | Kikuchi et al. |
| 2003/0143460 A1 | 7/2003 | Yoshida et al. |
| 2003/0152829 A1 | 8/2003 | Zhang et al. |
| 2003/0160589 A1 | 8/2003 | Krasnov et al. |
| 2004/0018424 A1 | 1/2004 | Zhang et al. |
| 2004/0064937 A1 | 4/2004 | Krasnov et al. |
| 2004/0086762 A1 | 5/2004 | Maeda et al. |
| 2004/0175609 A1 | 9/2004 | Yageta et al. |
| 2005/0079418 A1 | 4/2005 | Kelley et al. |
| 2005/0112461 A1 | 5/2005 | Amine et al. |
| 2005/0130032 A1 | 6/2005 | Krasnov et al. |
| 2005/0147877 A1 | 7/2005 | Tarnowski et al. |
| 2005/0156573 A1 | 7/2005 | Lin |
| 2005/0275370 A1 | 12/2005 | Kim |
| 2006/0027937 A1 | 2/2006 | Benson et al. |
| 2006/0040169 A1 | 2/2006 | Liu et al. |
| 2006/0040170 A1 | 2/2006 | Liu et al. |
| 2006/0060956 A1 | 3/2006 | Tanikella |
| 2006/0068258 A1 | 3/2006 | Kinoshita |
| 2006/0115706 A1 | 6/2006 | Maeda et al. |
| 2006/0134522 A1 | 6/2006 | Zhang et al. |
| 2006/0152196 A1 | 7/2006 | Matsumoto et al. |
| 2006/0216589 A1 | 9/2006 | Krasnov et al. |
| 2006/0226812 A1 | 10/2006 | Patino et al. |
| 2006/0267546 A1 | 11/2006 | Shen et al. |
| 2006/0278617 A1 | 12/2006 | Anantharaman et al. |
| 2007/0000688 A1 | 1/2007 | Mobley |
| 2007/0037054 A1 | 2/2007 | Kikuchi et al. |
| 2007/0047750 A1 | 3/2007 | Sauer et al. |
| 2007/0047796 A1 | 3/2007 | Anantharaman et al. |
| 2007/0104343 A1 | 5/2007 | Bengtsson et al. |
| 2007/0104344 A1 | 5/2007 | Goldberg |
| 2007/0125638 A1 | 6/2007 | Zhang et al. |
| 2007/0141460 A1 | 6/2007 | You et al. |
| 2007/0166612 A1 | 7/2007 | Krasnov et al. |
| 2007/0172739 A1 | 7/2007 | Visco et al. |
| 2007/0200258 A1 | 8/2007 | Mahler et al. |
| 2007/0297108 A1 | 12/2007 | Collins et al. |
| 2008/0003492 A1 | 1/2008 | Bates |
| 2008/0087986 A1 | 4/2008 | Tanikella |
| 2008/0191342 A1 | 8/2008 | Otremba |
| 2008/0213664 A1 | 9/2008 | Krasnov et al. |
| 2008/0217162 A1 | 9/2008 | Delrue et al. |
| 2008/0253098 A1 | 10/2008 | Liu |
| 2008/0263855 A1 | 10/2008 | Li et al. |
| 2008/0290363 A1 | 11/2008 | Lin et al. |
| 2008/0303056 A1 | 12/2008 | Ward et al. |
| 2008/0308935 A1 | 12/2008 | Kim et al. |
| 2009/0010462 A1 | 1/2009 | Ekchian et al. |
| 2009/0029500 A1 | 1/2009 | Wan |
| 2009/0039498 A1 | 2/2009 | Bayerer |
| 2009/0057136 A1 | 3/2009 | Wang et al. |
| 2009/0114429 A1 | 5/2009 | Sri-Jayantha et al. |
| 2009/0115051 A1 | 5/2009 | Leung et al. |
| 2009/0136839 A1 | 5/2009 | Kraznov et al. |
| 2009/0159433 A1 | 6/2009 | Neudecker et al. |
| 2009/0208671 A1 | 8/2009 | Nieh et al. |
| 2009/0214899 A1 | 8/2009 | Shakespeare et al. |
| 2010/0028767 A1 | 2/2010 | Inose et al. |
| 2010/0247987 A1 | 9/2010 | Holung et al. |
| 2010/0264017 A1 | 10/2010 | Nam et al. |
| 2010/0291431 A1 | 11/2010 | Shih et al. |
| 2011/0050159 A1 | 3/2011 | Nieh et al. |
| 2011/0076550 A1 | 3/2011 | Liang et al. |
| 2011/0076567 A1 | 3/2011 | Bouillon |
| 2011/0094094 A1 | 4/2011 | Li et al. |
| 2011/0270477 A1 | 11/2011 | Ueki |
| 2012/0003520 A1 | 1/2012 | Lee et al. |
| 2012/0034502 A1 | 2/2012 | Nieh et al. |
| 2012/0080940 A1 | 4/2012 | Larsen |
| 2012/0251867 A1 | 10/2012 | Krasnov et al. |
| 2012/0268057 A1 | 10/2012 | Wu |
| 2013/0098532 A1 | 4/2013 | Liang et al. |
| 2013/0164607 A1 | 6/2013 | Shih |
| 2013/0260230 A1 | 10/2013 | Liang et al. |
| 2014/0087227 A1 | 3/2014 | Shih |
| 2014/0106203 A1 | 4/2014 | Shih |
| 2014/0106216 A1 | 4/2014 | Liang |
| 2014/0166471 A1 | 6/2014 | Wang et al. |

FOREIGN PATENT DOCUMENTS

| | | |
|---|---|---|
| EP | 0933827 A1 | 8/1999 |
| EP | 1 353 429 A | 10/2003 |
| EP | 1 458 037 A | 9/2004 |
| EP | 1 415 355 | 1/2009 |
| FR | 2 403 652 A | 4/1979 |
| GB | 2251119 A | 6/1992 |
| JP | 59-032023 A | 2/1984 |
| JP | 59-226472 A | 12/1984 |
| JP | 60-072168 | 4/1985 |
| JP | 61195563 A | 8/1986 |
| JP | 04-295015 | 10/1992 |
| JP | 09-259929 A | 10/1997 |
| JP | H09-293516 A | 11/1997 |
| JP | 2001-044073 A | 2/2001 |
| JP | 2002-165358 | 6/2002 |
| JP | 2002-313289 | 10/2002 |
| JP | 2003-249199 A | 9/2003 |
| JP | 2009-123516 A1 | 6/2009 |
| WO | WO-95/14311 A | 5/1995 |
| WO | WO-98/08672 A1 | 3/1998 |
| WO | WO-99/23714 | 5/1999 |
| WO | WO-99/52589 A1 | 10/1999 |
| WO | WO-00/60689 A | 10/2000 |
| WO | WO-01/73873 A | 10/2001 |
| WO | WO-02/061828 A2 | 8/2002 |
| WO | WO-02/021627 A3 | 1/2003 |
| WO | WO-02/042516 A3 | 1/2003 |
| WO | WO-03/061049 A | 7/2003 |
| WO | WO-03/073531 A3 | 12/2003 |
| WO | WO-03/005477 A3 | 12/2004 |
| WO | WO-2004/111659 A2 | 12/2004 |
| WO | WO-2006/042357 A1 | 4/2006 |
| WO | WO-2006/105188 A1 | 10/2006 |
| WO | WO-2006/105050 A3 | 3/2007 |
| WO | WO-2007/042394 | 4/2007 |
| WO | WO-2008/004851 A1 | 1/2008 |
| WO | WO-2008/101254 | 8/2008 |
| WO | WO2008101254 | 8/2008 |
| WO | WO-2008/108999 A3 | 11/2008 |
| WO | WO-2008/134053 A1 | 11/2008 |
| WO | WO-2009/052683 A1 | 4/2009 |
| WO | WO-2009/073150 | 6/2009 |
| WO | WO 2011-066518 A | 6/2011 |
| WO | WO 2011-066518 A1 | 6/2011 |

OTHER PUBLICATIONS

Fragnaud et al. "Characterization of sprayed and sputter deposited LiCoO2 thin films for rechargeable microbatteries", J. Power Sources, 63 (1996), pp. 187-191.

Birke et al. "Materials for lithium thin-film batteries for application in silicon technology", Solid State Ionics, 93 (1997), pp. 1-15.

Benqlilou-Moudden et al. "Amorphous Lithium Cobalt and Nickel Oxides Thin Films Preparation and Characterization by RBS and PIGE", Thin Solid Films 333 (1998), pp. 16-19.

Yang et al., "Effect of annealing temperature on structure and electrochemical properties of LiCoO2 cathode thin films", Rare Metals, vol. 25, Dec. 2006, pp. 189-192.

PCT International Search Report in Application No. PCT/US2008/013213 (WO 2009/073150 A1), mailed Jun. 18, 2009.

(56) References Cited

OTHER PUBLICATIONS

Mattox, Donald M., Handbook of Physical Vapor Deposition (PVD) Processing, Film Formation, Adhesion, Surface Preparation and Contamination Control, 1998, pp. 127-135 and 343-364, Noyes Publications, Westwood, New Jersey, USA.
Non-Final Office Action dated Sep. 17, 2010 in U.S. Appl. No. 11/849,959, filed Sep. 4, 2007.
Final Office Action dated Feb. 15, 2010 in U.S. Appl. No. 11/849,959, filed Sep. 4, 2007.
Non-Final Office Action dated Aug. 13, 2012 in U.S. Appl. No. 11/849,959, filed Sep. 4, 2007.
Roh et al., "Effects of deposition condition on the ionic conductivity . . ." Scripta Materialia, Dec. 17, 1999, pp. 43-49, vol. 42. No. 1, New York, NY.
Bolster et al., "Investigation of lithium intercalation metal oxides for thermalbatteries" Proceedings of the 34th Int'l Power Source Symposium, Jun. 25-28, 1990, pp. 136-140.
Liang et al., U.S. Appl. No. 13/278,082, filed Oct. 20, 2011, for Thin Film Battery Packaging Formed by Localized Heating.
Nieh et al., U.S. Appl. No. 13/627,977, filed Sep. 26, 2012, for Plasma Deposition on a Partially Formed Battery Through a Mesh Screen.
Shih et al., U.S. Appl. No. 13/626,842, filed Sep. 25, 2012, for Solid State Battery Having Mismatched Cells.
Liang, Jiuh-Ming, U.S. Appl. No. 13/434,775, filed Mar. 29, 2012, for Localized Heat Treatment of Battery Component Films.
Shih et al., U.S. Appl. No. 13/333,969, filed Dec. 21, 2011, for Laminated Lithium Battery.
Shih et al., U.S. Appl. No. 13/652,416, filed Oct. 15, 2012, for Lithium Battery Having Low Leakage Anode.
PCT International Search Report in Application No. PCT/US2011/046674 dated Feb. 17, 2012.
Bates et al., "Preferred orientation of polycrystalline LiCoO2 films" J. of the Electrochemical Society (2000), pp. 59-70, Issue No. 147 (1).
Wagner et al., "Fabrication and Testing of thermoelectric thin film devices" 15th Int'l Conf. on Thermoelectrics, Mar. 26-29, 1996, pp. 269-273.
Neudecker et al., "Lithium-Free Thin-Film Battery . . ." Journal of the Electrochemical Society (2000), pp. 517-523, Issue No. 147 (2).
Park et al., "Characterization of tin oxide/LiMn2O4 thin-film cell," Journal of Power Sources, Jun. 2000, pp. 250-254, vol. 88, No. 2, Elsevier Science S.A.
PCT International Preliminary Report on Patentability, Application No. PCT/US2008/013213 (WO09/073150), Mailed Jun. 10, 2010.
PCT International Search Report in Application No. PCT/US2012/063100, mailed Feb. 28, 2013.
U.S. Appl. No. 12/894,571, Final Office Action Jul. 18, 2011.
U.S. Appl. No. 12/894,571, BPAI Decision Dec. 18, 2013.
U.S. Appl. No. 12/894,571, Notice of Allowance Jan. 6, 2014.
U.S. Appl. No. 11/796,487, Notice of Allowance, Sep. 10, 2010.
U.S. Appl. No. 12/032,997, Corrected Notice of Allowance, Sep. 2, 2014.
U.S. Appl. No. 12/032,997, Final Office Action May 27, 2009.
U.S. Appl. No. 12/032,997, Final Office Action Jul. 15, 2010.
U.S. Appl. No. 12/032,997, Final Office Action Nov. 13, 2010.
U.S. Appl. No. 12/032,997, Office Action Jan. 15, 2013.
U.S. Appl. No. 12/032,997, Office Action Dec. 23, 2009.
U.S. Appl. No. 12/032,997, Office Action Nov. 11, 2008.
U.S. Appl. No. 12/894,571, Office Action Mar. 2, 2011.
PCT/US2008/005462, Int'l Report on Patentability Jul. 28, 2008.
PCT/US2013/034487, Int'l Report on Patentability Jul. 10, 2013.
PCT Search Report, PCT/US2013/034487, dated Jul. 10, 2013.
U.S. Appl. No. 13/278,082, Final Rejection, mailed on Feb. 13, 2014.
U.S. Appl. No. 13/278,082, Non-Final Rejection, mailed on Jul. 24, 2013.

\* cited by examiner

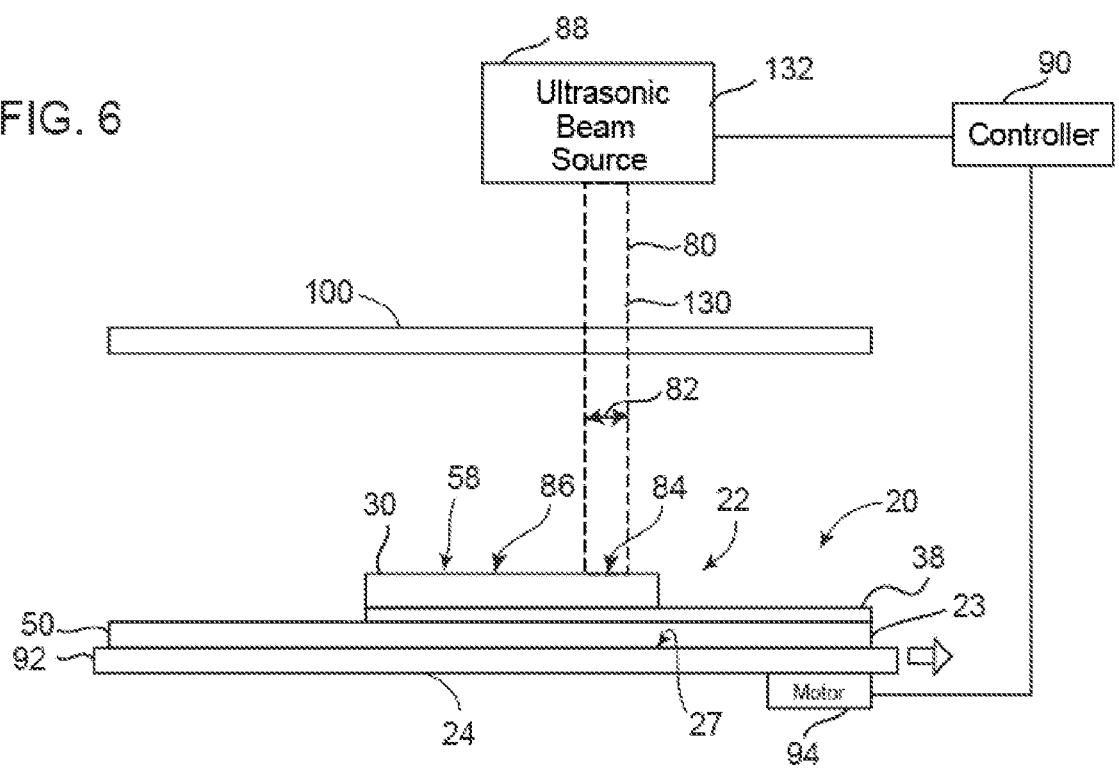
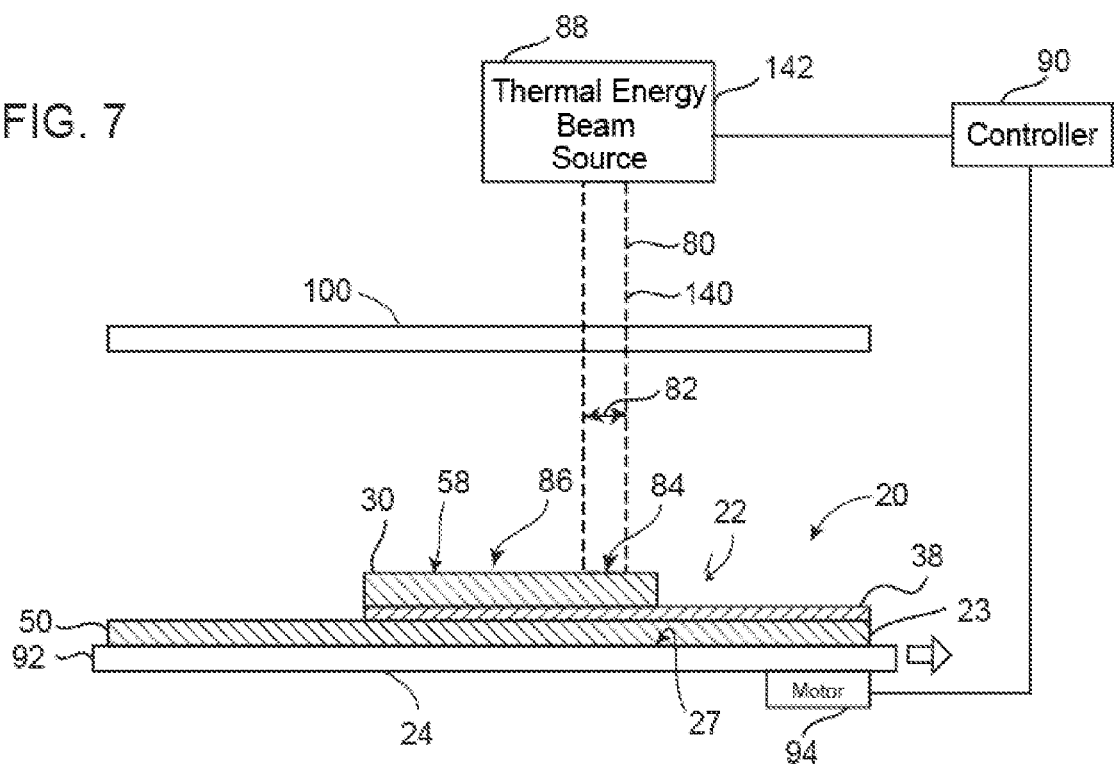

THIN FILM BATTERY AND LOCALIZED HEAT TREATMENT

CROSS-REFERENCE

The present application is a continuation-in-part of U.S. patent application Ser. No. 13/434,775, filed on Mar. 29, 2012, entitled "LOCALIZED HEAT TREATMENT OF BATTERY COMPONENT FILMS" to Liang, which is incorporated by reference herein and in its entirety.

BACKGROUND

Embodiments of the present invention relate to thin film batteries, such as solid state lithium batteries, and their fabrication and packaging.

Thin film batteries are used in applications that require a small battery with a high energy density such as, for example, portable electronics, medical devices and space systems. A solid state battery is a thin film battery composed of solid materials and which is generally absent liquid electrolytes. A thin film, sold state battery comprises a support having one or more battery cells, each battery cell comprising a set of battery component films which cooperate to store electrical charge and generate a voltage. The battery component films include an electrolyte sandwiched between electrodes, and can include metal-containing films composed of elemental metal, metal oxide or other metal-containing compounds. For example, elemental metal films can be used as current collectors to receive or provide electrons, such as for example, cathode and anode current collectors. The cathode or electrolyte can be metal oxide or metal-containing compounds. Thin film batteries have thicknesses smaller than the thickness of conventional batteries with battery component films thicknesses of less than 1000 microns, or even less than 100 microns. The battery component films are often formed by processes such as physical and chemical vapor deposition (PVD or CVD), oxidation, nitridation, and electroplating processes. These batteries can either be used individually or stacked together to provide more power or energy.

In thin film battery fabrication processes, the battery component films can be exposed to heat during processing or heat treated to anneal, re-crystallize, or reduce lattice defects. For example, elemental metal films are heat treated to reduce lattice defects and provide better conductivity. Metal oxide films are sometimes heated in air to anneal and/or obtain better crystalline properties. As an example, a cathode comprising a metal oxide electrode, such as a lithium cobalt oxide, provides better electrical properties when annealed in oxygen-containing environment at temperatures ranging from 300 to 700° C. It is believed that the electrical characteristics of the annealed cathode are related to its oxygen content and crystallographic structure, and when annealed, the cathode can allow the battery capacity to reach as high as its theoretical value for a given thickness and area. Still further, the lithium oxide film can be deposited to form a thicker cathode by depositing an amorphous or microcrystalline film, or a stack of sequentially deposited thin films, and thereafter, crystallizing the amorphous film or stack of films by heating. Increasing the thickness of a lithium oxide cathode film increases the energy density of the battery by as the thicker cathode provides greater charge retention and faster charging and discharging, as for example, taught in commonly assigned U.S. Pat. No. 7,186,479, entitled "THIN FILM BATTERY AND METHOD OF MANUFACTURE" to Krasnov et al., which is incorporated by reference herein in its entirety.

However, such heating and heat treatment processes often occur after deposition of underlying battery component films, and as such, can result in thermal degradation or oxidation of underlying layers. For example, heat treatment of an overlying cathode of metal oxide can cause oxidation of any underlying metal layers. As an example, good electrical conductors such as aluminum and copper, partially oxidize when annealed in environments having low partial pressures of oxygen. Further, aluminum oxide, when formed, is a dielectric having a high electrical resistivity of $1 \times 10^{14}$ square-cm, which renders even a thin layer of aluminum oxide undesirable for a battery cell. Similarly copper is also prone to oxidation at elevated temperatures and in oxygen containing environments.

Nonreactive noble metals, such as platinum or gold, have also been used in battery cells to prevent or reduce such thermal or oxidation degradation. For example, lithium batteries often use a cathode current collector composed of platinum underlying a metal oxide cathode which is heated in an oxygen-containing environment to anneal and/or crystallize the cathode material, as for example, described in commonly assigned U.S. Pat. No. 7,862,927, entitled "THIN FILM BATTERY AND MANUFACTURING METHOD" to Krasnov et al., which is incorporated by reference herein and in its entirety. Platinum avoids oxidation and remains in its electrically conductive elemental metal form without oxidizing even after being heated in an oxidizing environment.

However, cathode current collectors composed of noble materials, such as platinum or gold, can be costly and substantially increase the price of the battery. Still further, platinum can exhibit poor adhesion to certain battery supports. Also, the difference in thermal expansion coefficients between platinum and a battery support material can result in delamination of the deposited platinum film when heated. Thus an adhesive layer is often deposited on the battery support prior to deposition of the platinum layer to increase adhesion and reduce peeling-off. However, the additional deposition step required for forming the adhesion layer adds to fabrication costs and complexity.

For reasons including these and other deficiencies, and despite the development of various battery structures, and deposition and heat treatment processes for solid-state, thin film batteries, further improvements in such batteries and fabrication steps are continuously being sought.

SUMMARY

A lithium battery comprises a battery support and a cathode current collector directly on and in contact with the battery support. The cathode current collector is composed of molybdenum and comprises a thickness of at least about 0.01 microns. A cathode is on the cathode current collector, an electrolyte on the cathode, and at least one of an anode or anode current collector on the electrolyte.

A lithium battery comprises a battery support and a cathode current collector directly on and in contact with the battery support. The cathode current collector is composed of nickel and comprises a thickness of at least about 0.01 microns. A cathode is on the cathode current collector, an electrolyte on the cathode, and at least one of an anode or anode current collector on the electrolyte.

A lithium battery comprises a battery support and a cathode current collector directly on and in contact with the battery support. The cathode current collector is composed of chromium and comprises a thickness of at least about 0.01 microns. A cathode is on the cathode current collector, an electrolyte on the cathode, and at least one of an anode or anode current collector on the electrolyte.

A lithium battery comprises a battery support and a cathode current collector directly on and in contact with the battery support. The cathode current collector is composed of tantalum and comprises a thickness of at least about 0.01 microns. A cathode is on the cathode current collector, an electrolyte on the cathode, and at least one of an anode or anode current collector on the electrolyte.

A lithium battery comprises a battery support and a cathode current collector directly on and in contact with the battery support. The cathode current collector is composed of titanium and comprises a thickness of at least about 0.01 microns. A cathode is on the cathode current collector, an electrolyte on the cathode, and at least one of an anode or anode current collector on the electrolyte.

A lithium battery comprises a battery support and a cathode current collector directly on and in contact with the battery support. The cathode current collector is composed of tungsten and comprises a thickness of at least about 0.01 microns. A cathode is on the cathode current collector, an electrolyte on the cathode, and at least one of an anode or anode current collector on the electrolyte.

A lithium battery manufacturing method comprises providing a support and forming a cathode current collector directly on the battery support and without an intervening adhesion layer. The cathode current collector is composed of molybdenum in a thickness of at least about 0.01 microns. A cathode is formed on the cathode current collector, an electrolyte on the cathode, and an anode on the electrolyte.

A battery fabrication method comprises forming on a support, at least a portion of a battery cell comprising a plurality of battery component films that include an underlying film with an overlying metal-containing film. A beam incident area on the metal-containing film is locally heated by directing onto the metal-containing film, an energy beam maintained at a fluence of at least about 800 J/cm$^2$, wherein the metal-containing film is heated to a temperature that is at least 100° C. higher than the temperature attained by the underlying film.

In another version, the battery fabrication method comprises forming on a support, at least a portion of a battery cell comprising an elemental electrode and a metal oxide electrode. An energy beam is directed onto the metal oxide electrode, the energy beam being maintained at a sufficiently low power level to heat a beam incident area on the metal oxide electrode to a temperature of at least 400° C.

In still another version, the battery fabrication method comprises forming on a support, an elemental metal electrode and an overlying metal oxide electrode. An energy beam is selected such that the energy beam has at least one of the following characteristics: (i) a linear attenuation coefficient in the metal oxide electrode of at least about 5×10$^{-4}$; and (ii) a reflection coefficient from the elemental metal electrode that is at least about 5%. The energy beam is directed onto the metal oxide electrode to heat treat the metal oxide electrode.

DRAWINGS

These features, aspects, and advantages of the present invention will become better understood with regard to the following description, appended claims, and accompanying drawings, which illustrate examples of the invention. However, it is to be understood that each of the features shown in the drawings can be used in the invention in general, not merely in the context of the particular drawings, and the invention includes any combination of these features, where:

FIG. 6 is a schematic diagram of an embodiment of an ultrasonic beam apparatus capable of locally heating the battery component film;

FIG. 7 is a schematic diagram of an embodiment of a thermal energy beam apparatus capable of locally heating the battery component film;

Figure 9:
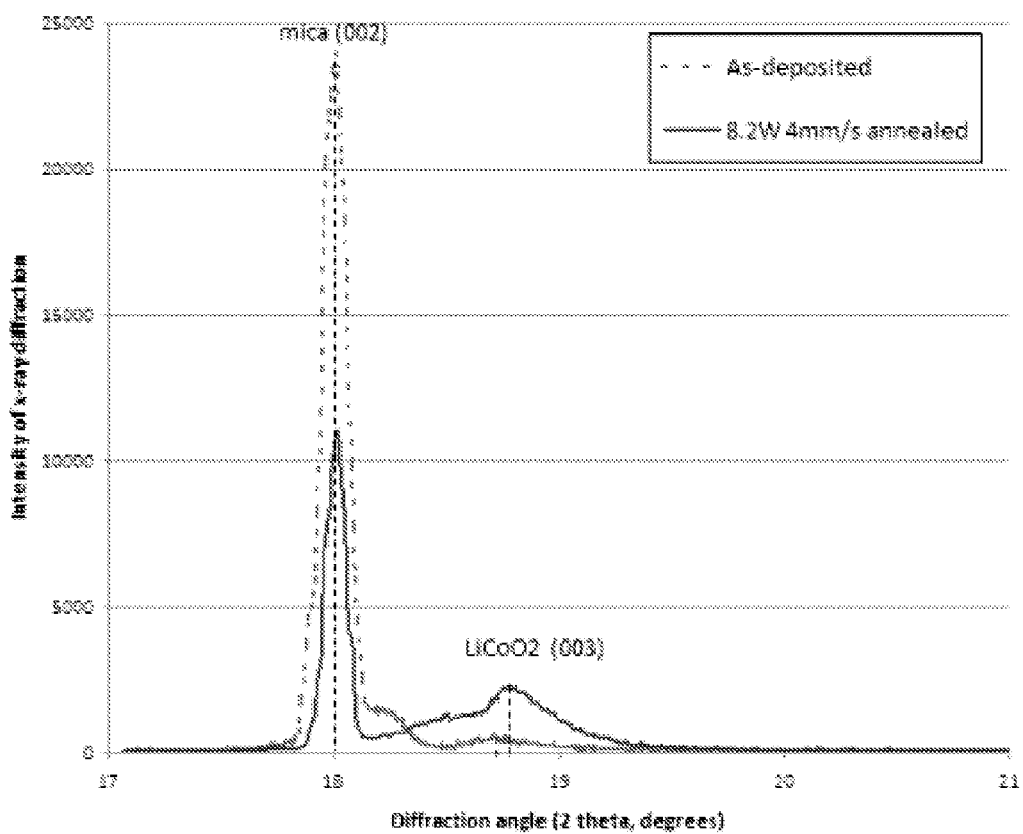
Figure 10:
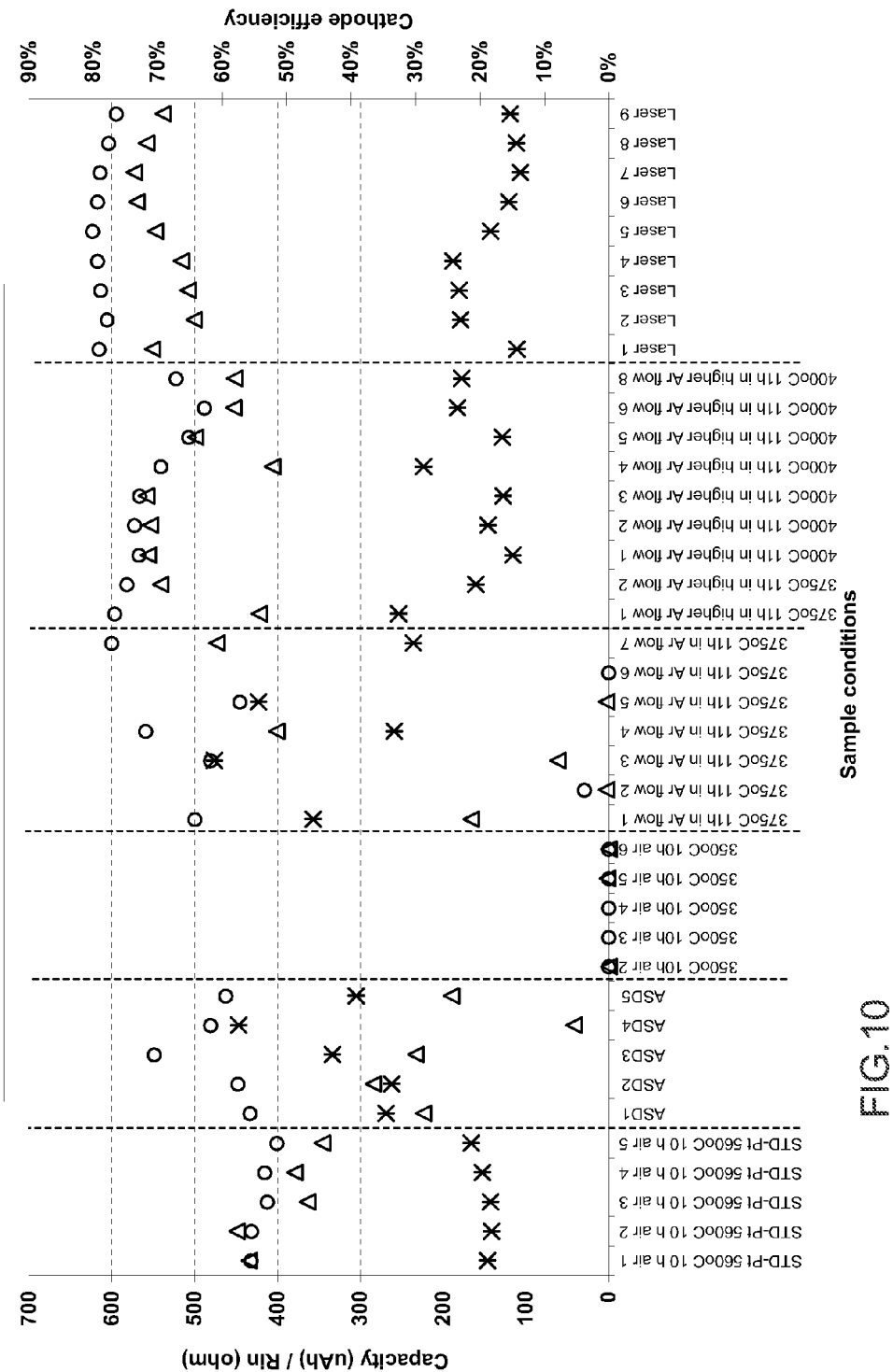

FIG. 9 is a graph showing the X-ray diffraction intensity for increasing X-ray incident angle for a heat treated (annealed) and as deposited (no heat treatment) metal-containing film comprising a cathode film of LiCoO$_2$; and FIG. 10 is a graph comparing the measured charge capacity, internal resistance (Rin), and cathode efficiency of battery cells having a cathode current collector that is either molybdenum or platinum, and with different annealing treatments that include (i) no annealing, (ii) annealing in air or argon, and (iii) annealing with an energy beam source that is a laser.

DESCRIPTION

Figure 1A:
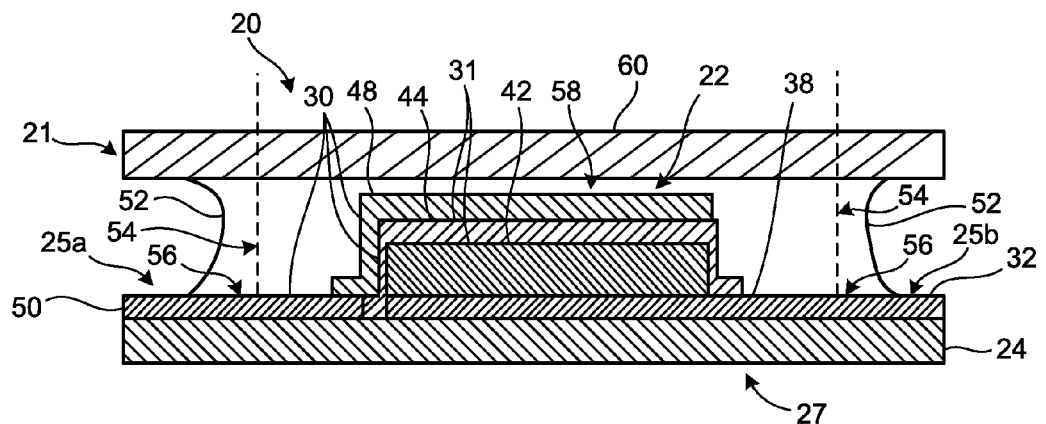
FIG. 1A is a schematic sectional side view of an embodiment of a lithium battery comprising a battery cell on a support.
Figure 1B:
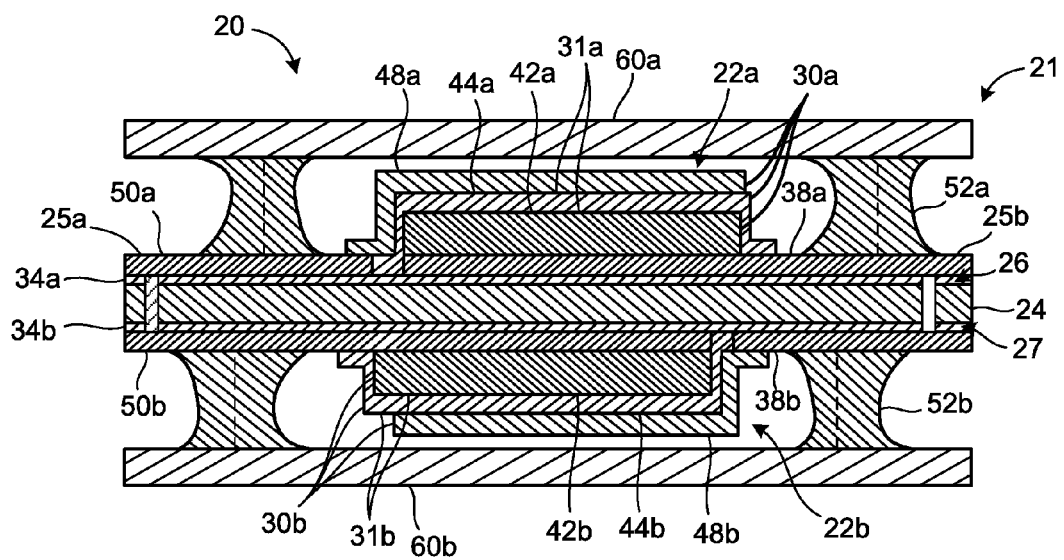
FIG. 1B is a schematic sectional side view of another embodiment of a lithium battery comprising a first battery cell on a first surface of a support and a second battery cell on a second surface of the same support.

Exemplary embodiments of a rechargeable, thin film, solid-state battery 20 having a protective casing 21 enclosing one or more solid-state battery cells 22 are shown in FIGS. 1A and 1B. The protective casing 21 protects the battery cell 22 from degradation in the external environment. The battery support 24 comprises a material that has low permeability to oxygen, water vapor, carbon monoxide, carbon dioxide and the like. The battery support 24 should also have a relatively smooth surface and sufficient strength to support battery cells 22 at conventional fabrication or operational temperatures. For example, the battery support 24 can comprise aluminum, aluminum oxide, metal foil, metalized plastic layer, mica, quartz, or steel. In one version, the battery support 24 comprises a first surface 26 and a second surface 27 both of which are planar, or even flat and smooth. One desirable type of battery support 24 comprises a crystalline sheet formed by cleaving the planes of a cleavable crystalline structure, such as mica or graphite. Terminals 25a,b extend out of the protective casing 21 of the battery 20. The exemplary versions of batteries 20 illustrated herein are provided to demonstrate features of the battery and illustrate processes of fabrication; however, it should be understood that these exemplary battery structures should not be used to limit the scope of the invention, and alternative battery structures as would be apparent to those of ordinary skill in the art are within the scope of the present invention.

Referring to FIG. 1A, the solid-state battery cell 22 includes battery component layers 30 that are solid and cooperate to form a battery capable of receiving, storing, and discharging electrical energy. The battery component layers 30 include one or more metal-containing layers 31 which contain charge-carrying metal species. The metal-containing layers 31 comprise solid layers containing elemental metal or metal-containing compounds. The charge-carrying metal species are metal ions that migrate within or across one or more of the metal-containing layers 31 to carry charge across the battery cell 22. When the charging current is applied across the battery cell 22, the charge-carrying metal species migrates from the cathode 42, through the electrolyte 44 and accumulate in or about the anode 48 to store electrical charge. Conversely, when an electrical load is applied across the battery cell 22, the accumulated charge-carrying metal species in the anode 48 migrate to the cathode 42 to release electrons. For example, during the charging process in a solid-state lithium battery cell 22, lithium ions travel from the cathode 42 through the electrolyte 44 to accumulate in the anode 48, comprising a cathode 42 composed of $LiCoO_2$, and electrolyte 44 comprising LiPON, and an anode 48 comprising lithium. In lithium battery cells 22, if the anode 48 is made from copper instead of lithium, the lithium metal ions travel out of the cathode 42 during the charging process to accumulate and form a lithium anode layer on the copper anode; whereas, during the discharging process the accumulated lithium ions in the lithium anode layer return to the cathode 42.

In the version shown in FIG. 1A, the battery cell 22 is formed or deposited directly on the first surface 26 of the battery support 24, and is absent any adhesion layer intervening between the battery component layers 30 and the battery support 24. The battery component layers 30 include at least a pair of electrodes 32 on either side of an electrolyte 44. The electrodes 32 and electrolyte 44 are both metal-containing layers 31 that contain the charge-carrying metal species. The electrodes 32 can include any one or more of a cathode current collector 38, cathode 42, anode 48, and anode current collector 50, which are all interchangeable and can be designed to replace one another. In this version, the cathode current collector 38 and the anode current collector 50 are deposited on the battery support 24 so that these layers are chemically bonded to the surface 26 of the support 24. The battery component layers 30 can have, for example, thicknesses of from about 0.1 microns to about 100 microns. The protective casing 21 can include a polymer 52 covering one or more of the side perimeter surfaces 54 that extend along the perimeter 56 of the battery 20, as well as the top surface 58 of the battery 20. The casing 21 can also include a cap 60 which covers the top surface 58 of the battery 20.

In the version shown in FIG. 1B, the solid-state battery 20 comprises a first battery cell 22a formed on the first surface 26 of the battery support 24 and a second battery cell 22b formed on the second surface 27 of the battery support 24. While single battery cells 22a,b are shown, it should be understood that more than one battery cell 22a or 22b can be arranged horizontally across the top or second surfaces 26, 27, respectively, of the battery support 24. Each battery cell 22a,b comprises a plurality of battery component layers 30a,b that include an optional adhesion layer 34a,b; cathode current collector 38a,b; cathode 42a,b; electrolyte 44a,b; anode 48a, b; and second or anode current collector 50a,b, respectively. The adhesion layers 34a,b, when provided, underlie each of the battery cells 22a,b and are initially deposited on the first and second surfaces 26, 27 respectively, to adhere subsequently deposited layers onto the battery support 24. The adhesion layer 34 can be used or not, depending on the type of material used to fabricate initially deposited, battery component layers 30, such as the cathode current collector 38, anode current collector 50 or other layer. In the version shown, the cathode current collectors 38a,b and the anode current collectors 50a,b are deposited on the adhesion layer 34 and over the battery support 24. This version of the battery 20 having two opposing cells 22a,b can be formed using the same processes used to form the battery 20 with the single cell 22 shown in FIG. 1A, by flipping over the battery support 24 to form the battery layer components 30b of the second battery cell 22b, during or after processing of the first battery cell 30a. Alternatively, the battery layer components 30a,b can be formed simultaneously using a plasma chamber having plasma sources on either side of the battery support 24. In this battery 20, the protective casing 21 includes two layers or beads of polymer 52a,b covering the two battery cells 22a,b, respectively, as well as two covers 60a,b.

An exemplary embodiment of a method of fabricating a thin film battery 20 comprising a battery cell 22 on a support 24 will be illustrated with reference to FIGS. 2A to 2C. While exemplary embodiments of a thin film battery 20 and process of manufacture are described, it should be understood that other battery structures and fabrication processes can also be used as would be apparent to one of ordinary skill in the art. For example, the fabrication process described herein can include processes of forming a battery cell 22 which are found in commonly assigned US Patent Publication No. US 2009-0208671 A1, filed on Feb. 18, 2008, entitled "THIN FILM BATTERY FABRICATION USING LASER SHAPING" to Nieh et al.; as well as U.S. Pat. No. 6,921,464; U.S. Pat. No. 6,632,563, U.S. Pat. No. 6,863,699, and U.S. Pat. No. 7,186,479; all of which are incorporated by reference herein and in their entireties.

Figure 2A:
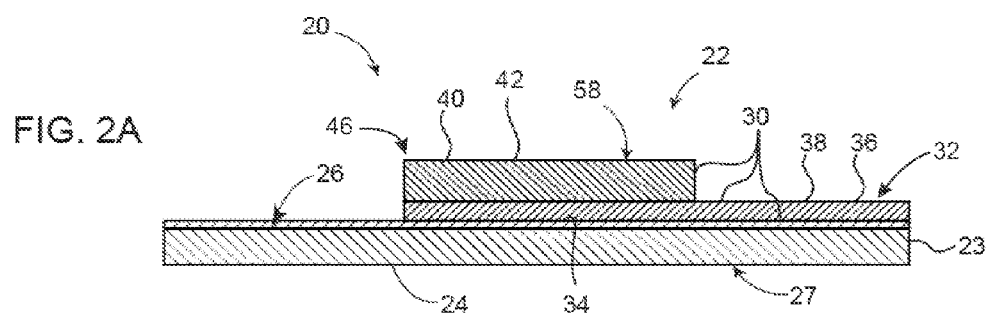
FIG. 2A is a sectional side view of an exemplary embodiment of a partially fabricated battery cell on a support, the battery cell comprising battery component films that include metal-containing films such as an elemental metal electrode and an overlying metal oxide electrode.
Figure 3A:
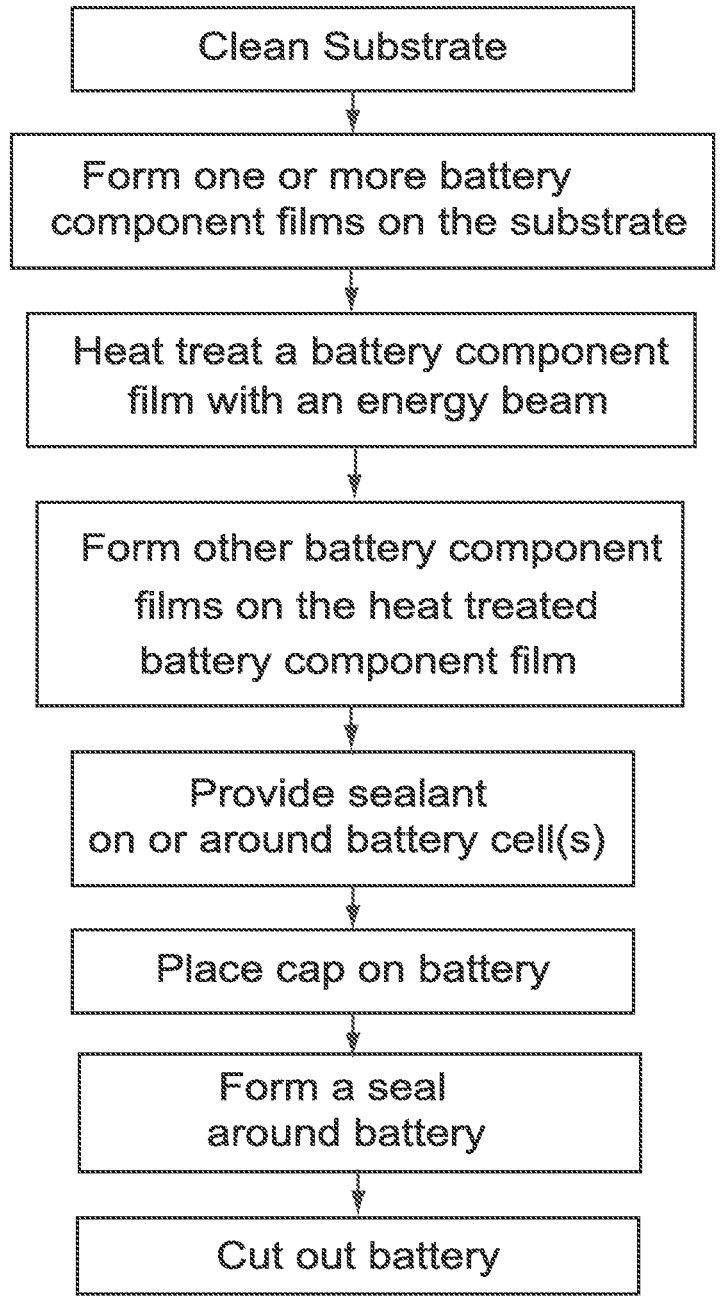
FIG. 3A is a flowchart illustrating an exemplary battery fabrication process which includes heat treating a battery component film of a battery cell.

Referring to FIG. 3A, the top and bottom surfaces 26, 27 of the support 24 (as shown in FIG. 2A) are cleaned to remove surface contaminants to obtain good adherence of deposited films. For example, the support 24 can be cleaned by an annealing process in which the support is heated to temperatures sufficiently high to clean the surface by burning off contaminants and impurities, such as organic materials, water, dust, and other materials deposited on the surfaces 26, 27. The support 24 can also be heated to temperatures sufficiently high to remove any water of crystallization that maybe present in the support material. The annealing temperatures and/or water of crystallization removal temperatures can be, for example, from about 150 to about 600° C., or even at least about 540° C. The annealing process can be conducted in an oxygen-containing gas, such as oxygen or air, or other gas environments, for about 10 to about 120 minutes, for example, about 60 minutes.

After a clean top surface 26 is obtained, one or more battery component films 30, which can be metal-containing films or non-metallic films, are deposited on the surface 26 of the support 24 to form at least a portion of a battery cell 22 of a battery 20. An exemplary version of a completed battery 20 having one battery cell 22 is shown for example in FIG. 2C. The battery component layers 30 contain one or more solid state, lithium-containing films 31 composed of elemental lithium and lithium compounds. In a minimal configuration, a battery cell 22 comprises a solid state electrolyte 44 that is sandwiched between at least a pair of solid state electrodes that include (i) a cathode current collector 38 and/or cathode 42, and (ii) an anode 48 and/or anode current collector 50. The electrodes collect electrons which are released from one surface of the solid state electrolyte when ions travel through the electrolyte 44, and return electrons to the other surface of the electrolyte 44.

The type or number of battery component films 30, sequence of deposition of these films on the support 24, heat treatment of particular films 30 and not others, and number and location of the battery cells 22, can be changed as would be apparent to those of ordinary skill in the art. It should also be noted that before or after fabrication of any of the battery component layers 30, the battery cell 22, battery component layers 30, or support 24, can be shaped to form shaped features by removing portions of any of the battery component layers 30 or support 24. The shaping processes can be performed, for example, after deposition of the cathode 42 and electrolyte 44, to shape one or both of these films, such as by etching away the edge portions 77 or forming holes for the terminals 25a,b. Suitable shaping processes include pulsed laser, etching, another such processes, and these processes can be used to form the shapes of the battery component layers 30 shown in any of FIGS. 1A, 1B and 2C. Thus, the scope of the claims should not be limited to the exemplary process embodiments or sequence of process steps described herein to illustrate aspects of the invention.

Figure 3B:
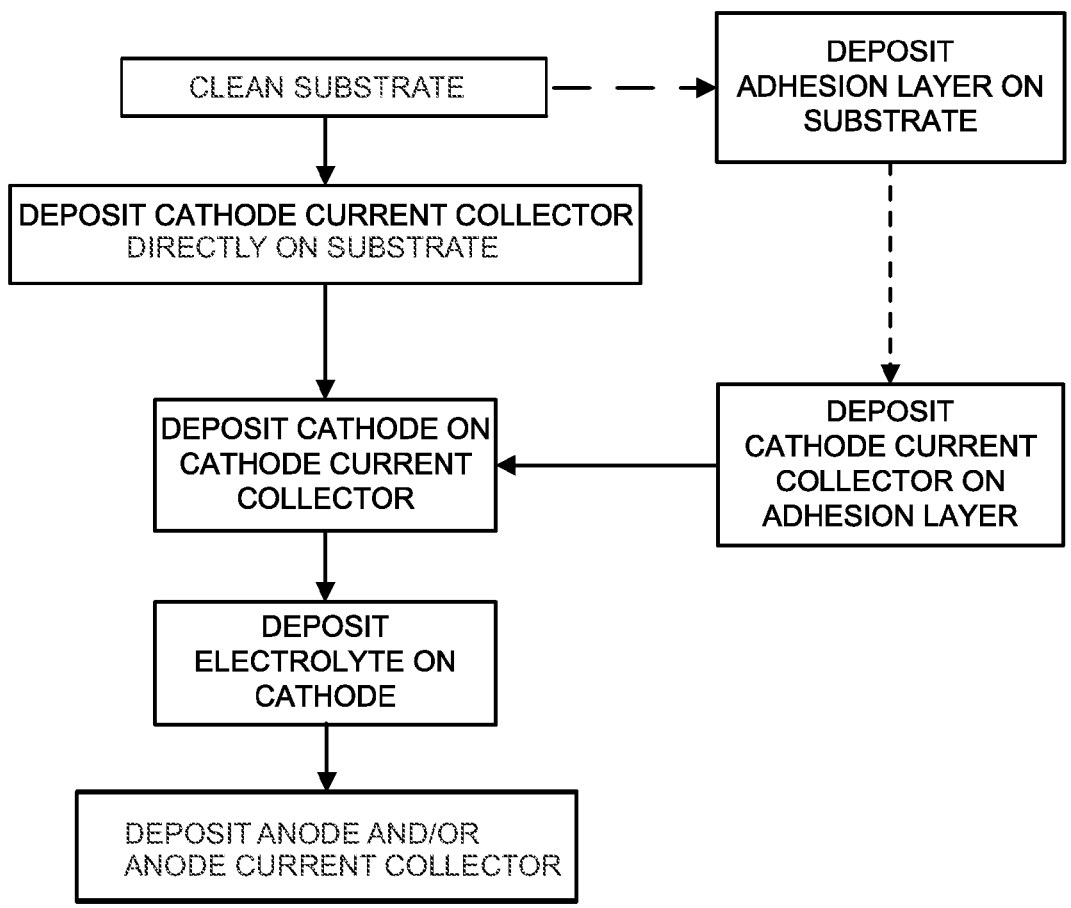
FIG. 3B is a flowchart illustrating an exemplary process of forming a solid state lithium battery cell comprising a cathode current collector, cathode, electrolyte, anode and anode current collector.

Referring to FIG. 3B, in one version, after cleaning, a battery component layer 30 comprising a first metal-containing film 32 is then formed on an adhesion layer 34 or directly on the support 24 and absent an intervening adhesion layer 34. Whether or not the adhesion layer 34 is used, depends on the type or materials, microstructures, and/or thicknesses of the initially deposited first battery component layers 30, such as the cathode current collector 38, cathode 42, etc. In the first version, an optional adhesion layer 34 is first deposited on the support 24 when the overlying battery component layer 30 require the adhesion layer for adhesion to the support 24, as shown in FIG. 2A. Suitable adhesion layers 34 can include a metal or metal compound, such as for example, aluminum, cobalt, titanium, other metals, or their alloys or compounds thereof; or a ceramic oxide such as, for example, lithium cobalt oxide. A titanium adhesion layer is deposited in a sputtering chamber with, for example, the following sputtering process conditions: sputtering gas comprising argon at a pressure of from about 1 mTorr to 20 mTorr or even 2 mTorr; a DC (direct current) sputtering plasma at a power level of from about 500 W to about 5 kW or even about 1 kW, a deposition time of about 10 to 60 seconds, titanium target size of 5×20 inches, and target to support distance of from about 10 to about 20 cm. The adhesion layer 34 is deposited to a thickness of from about 100 to about 1500 angstroms. To form batteries 20 on both sides of the support, a second adhesion layer (not shown) is deposited on the planar bottom surface 27, and one or more second battery cells (also not shown) are formed on the bottom surface 27.

The first metal-containing film 32, in this version, is an elemental metal electrode 36 to collect electrons during battery charging and discharging processes. The elemental metal electrode 36 can be composed of a metal in its elemental form, such as for example, aluminum, platinum, silver or gold. The elemental metal electrode 36 can also comprise the same metal as the adhesion layer 34 which is deposited in a thickness that is sufficiently high to provide the desired electrical conductivity. A suitable thickness for the elemental metal electrode 36 is at least about 0.01 microns, or even from about 0.05 microns to about 2 microns.

An elemental metal electrode 36 that serves as a cathode current collector 38 collects electrons during charge and discharge process, and as such is selected to have an electrical conductivity of at least about $1 \times 10^6$ S/M. In addition, the cathode current collector 38 should be resistance to oxidation at elevated process temperatures; otherwise, a native oxide film formed on its surface during heat treatment can affect electrical conductance and reduce battery performance. More specifically, the internal resistance of the solid-state battery 20 increases due to the resultant thin surface oxide layer after annealing in oxygen-containing environments.

In one version, a cathode current collector 38 composed of platinum was used to provide both good oxidation resistance and electrical conductivity, and does not react with oxygen or water moisture at room temperatures. The platinum was deposited by DC magnetron sputtering of a sputtering target composed of platinum; a sputtering gas comprising argon at a gas pressure of from about 1 mTorr to about 50 mTorr, for example about 5 mTorr; a DC plasma formed from electrodes maintained at a power level of from about 10 to about 400 W, for example about 40 W; and a deposition time of from about 1 to about 20 minutes. An elemental metal electrode 36 of platinum can have a thickness of about 0.2 microns.

Figure 8:
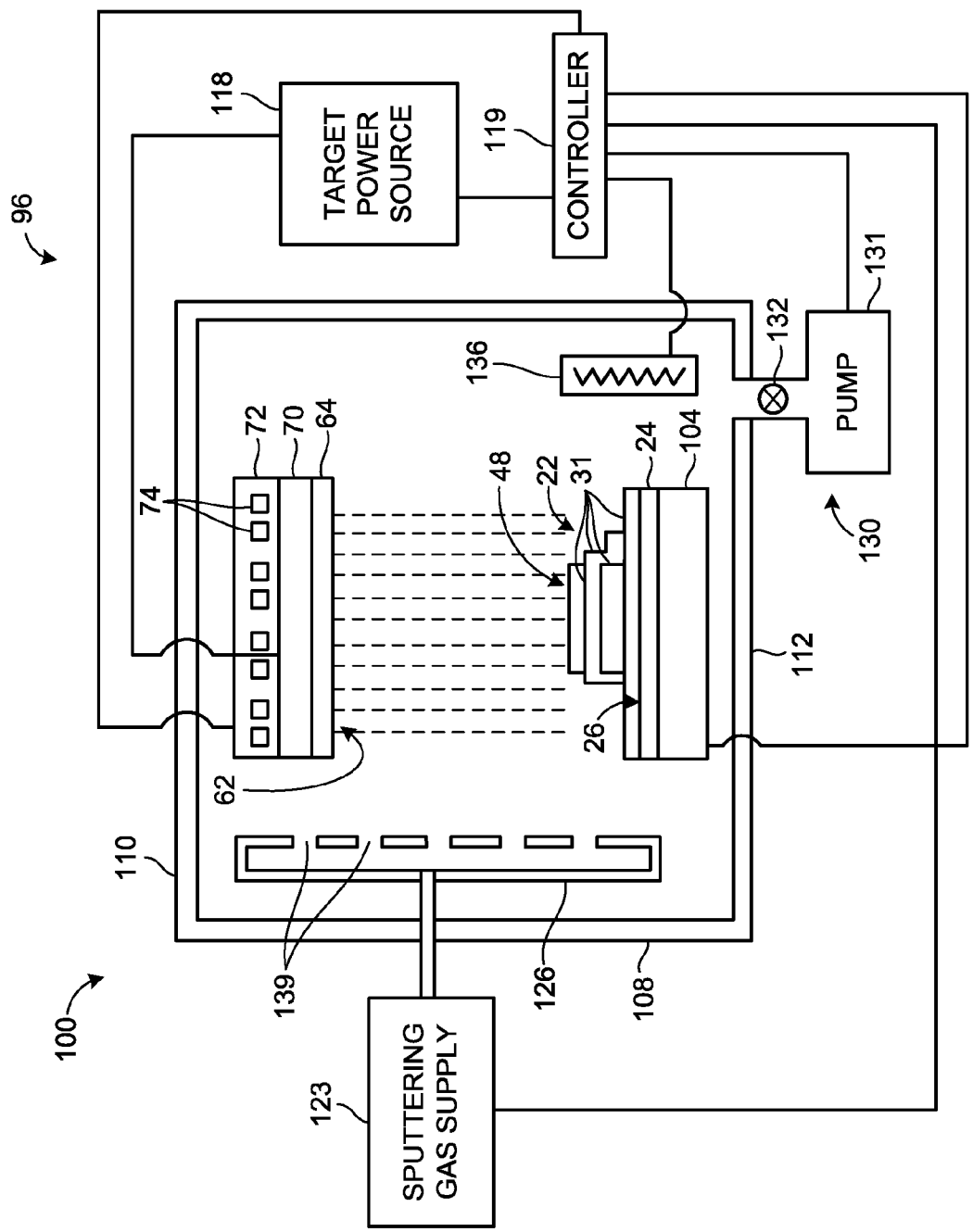
FIG. 8 is a sectional side schematic view of a sputtering chamber with a sputtering target and a support.

In another version, the elemental metal electrode 36 is composed of a non-conventional metal which was selected to serve as a cathode current collector 38. These materials all had a melting point that exceeds 1000° C. which provides enhanced resistance to oxidation when the cathode current collector 38 is heated in an oxygen-gas containing environment. The materials also were selected to have a high electronegativity under the Pauling scale of at least about 1.5, or even at least about 1.9, or even at least about 2, which all demonstrate good oxidation resistance. The materials were also selected to provide good adhesion to many support materials and lower thermal expansion than the noble metals. Any of these materials can be deposited by sputtering in sputtering chamber as shown in FIG. 8. Suitable sputtering conditions for depositing an elemental metal electrode 36 comprise selecting a sputtering target composed of the metal to be deposited and mounting the target in the sputtering chamber; introducing a sputtering gas, such as for example argon, into a sputtering chamber at a flow rate of from about 1 to about 10,000 sccm and maintaining a sputtering gas pressure of from about 1 mTorr to about 10 Torr; and forming a plasma from the sputtering gas by charging electrodes in the sputtering chamber at a power level of from about 10 W to about 5 KW for from about 1 to about 60 minutes.

In one example, a cathode current collector 38 composed of molybdenum (Mo) is deposited directly on a battery support 24. Molybdenum has found to provide good electrical conductivity, high oxidation resistance, and was also capable of adhering directly to a battery support 24 of mica without an intervening adhesion layer. The molybdenum layer was deposited using deposition conditions which included a deposition gas comprising argon at a flow rate of from about 1 sccm to about 30 sccm, a gas pressure of from about 1 mTorr to about 10 mTorr, a support temperature of from about 25° C. to about 150° C., and a DC plasma power level of from about 0.01 kW to about 1 kW. Good adhesion to the underlying mica support 24 was evidenced by visually observation, observing the film in an optical and scanning electron microscope, and applying an adhesion tape test. The molybdenum had a relatively low electrical resistivity of 53 nΩM to provide better conduction of the electrons. Molybdenum also has a high electronegativity using the Pauling scale of 2.19 which provides good oxidation resistance. In fact the deposited molybdenum layer was found not to exhibit bulk oxidation until heated to temperatures above 790° C. The deposited molybdenum layer was also found not to visibly react with oxygen or water vapor at room temperatures.

In yet another version, in which an adhesion layer 34 may not be needed, a cathode current collector 38 composed of nickel (Ni) is deposited on the support 24. The nickel layer can be deposited using deposition conditions such as, for example, a deposition gas comprising argon at a flow rate of from about 1 sccm to about 30 sccm, gas pressure of from about 1 mTorr to about 10 mTorr, a support temperature of from about 25° C. to about 150° C., and a DC plasma power level of from about 0.01 kW to about 1 kW. Good adhesion to the mica support can be evidenced by the adhesion tape test. Nickel also has good electrical properties including an electrical resistivity of 69 nΩM. The low resistivity provided better conduction of the electrons. Nickel also has a high electronegativity using the Pauling scale of 1.91 which provides good oxidation resistance and nickel does not exhibit bulk oxidation at room temperature. The deposited nickel layer was found not to visibly react with oxygen or water vapor at room temperature.

In still another version, the cathode current collector 38 is composed of tungsten (W). The tungsten layer can be deposited using deposition conditions such as a deposition gas comprising argon at a flow rate of from about 1 sccm to about 30 sccm, a gas pressure of from about 1 mTorr to about 10 mTorr, a support temperature of from about 25° C. to about 150° C., and a DC plasma power level of from about 0.01 kW to about 1 kW. Good adhesion to a mica support can be evidenced by an adhesion tape test. Tungsten also has good electrical properties including an electrical resistivity of 53 nΩM. The low resistivity provided better conduction of the electrons. Tungsten also has a high electronegativity using the Pauling scale of 2.36, which provides good oxidation resistance, and absence of bulk oxidation until heated to temperatures above 700° C. Tungsten also has a high melting point at 3695 K. A deposited tungsten layer was found not to visibly react with oxygen or water vapor at room temperature In still another version, in which the adhesion layer 34 may not be needed, the cathode current collector 38 is composed of tantalum (Ta). The tantalum layer can be deposited using a PVD process in which a sputtering target of tantalum is sputtered using a sputtering gas comprising argon at a flow rate of from about 50 to about 250 sccm, a gas pressure of from about 3 mTorr to about 10 mTorr, a substrate temperature of less than 100° C., and a DC voltage plasma having a power level of from about 1 to about 10 KW. In addition, tantalum also had other good electrical properties including an electrical resistivity of which provided better 131 nΩM. Tantalum also has a high electronegativity using the Pauling scale of 1.5 which provides good oxidation resistance. Tantalum also has a high melting point at 3290 K.

In another version, in which the adhesion layer 34 may not be needed, the cathode current collector 38 is composed of titanium (Ti). The titanium layer can be deposited using a PVD process in which a sputtering target of titanium is sputtered using a sputtering gas comprising argon at a flow rate of from about 50 to about 250 sccm, a gas pressure of from about 3 mTorr to about 10 mTorr, a substrate temperature of less than 100° C., and a DC voltage plasma having a power level of from about 1 to about 10 KW. In addition, titanium also had other good electrical properties including an electrical resistivity of 420 nΩM, and a high electronegativity using the Pauling scale of 1.54 which provides good oxidation resistance.

In another version, in which the adhesion layer 34 may not be not needed, the cathode current collector 38 is composed of chromium (Cr). The chromium layer can be deposited using a PVD process in which a sputtering target of chromium is sputtered using a sputtering gas comprising argon at a flow rate of from about 50 to about 250 sccm, a gas pressure of from about 3 mTorr to about 10 mTorr, a substrate temperature of less than 100° C., and a DC voltage plasma having a power level of from about 1 to about 10 KW. Chromium also has other good electrical properties including an electrical resistivity of 125 nΩM and a high electronegativity using the Pauling scale of 1.66 which provides good oxidation resistance.

Figure 2B:
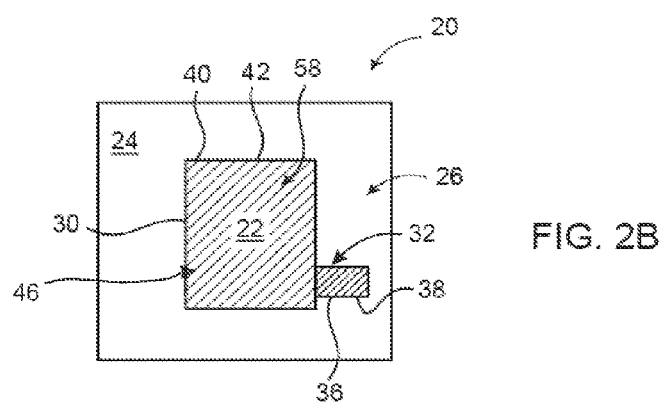
FIG. 2B is a top plan view of the partially fabricated battery cell of FIG. 1A.
Figure 2C:
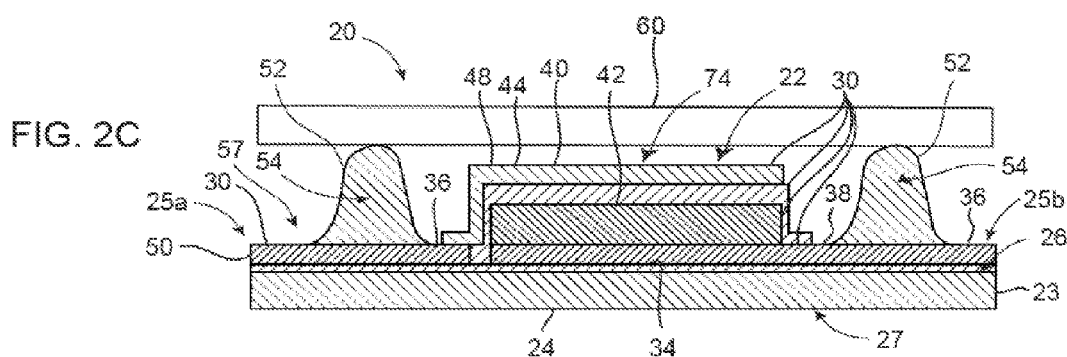
FIG. 2C is a sectional side view of the completed battery of FIG. 1A.

After deposition of the first metal-containing film 32, such the cathode current collector 38, a second metal-containing film 46, such as a metal oxide electrode 40, is formed to obtain a partially fabricated structure of a battery cell 22 as shown in FIGS. 2A and 2B. The metal oxide electrode 40 comprises a metallic oxide or a mixture of metal oxides, and in one version, the metal oxide electrode 40 is an electrochemically active material serves as the cathode 42. For lithium batteries, a metal oxide electrode 40 that can serve as a cathode 42 can be composed of lithium metal oxide, such as for example, lithium cobalt oxide, lithium nickel oxide, lithium manganese oxide, lithium iron oxide, or even lithium oxides comprising mixtures of transition metals such as for example, lithium cobalt nickel oxide, Suitable lithium-containing transition metal oxides include $LiCoO_2$, $LiNiO_2$, $LiMn_2O_4$, $LiMnO_2$, $LiCo_{0.5}Ni_{0.5}O_2$ and $LiNiO_{0.7}Co_{0.2}Mn_{0.1}O_2$ and. Other types of cathodes 42 that may be used include lithium-free metal oxides such as manganese dioxide ($MnO_2$), amorphous or crystalline vanadium pentoxide ($V_2O_5$) or titanium disulphide ($TiS_2$). The metal oxide electrode 40 can be deposited as a single film or a stack of films, with alternate deposition and annealing steps. In one version, the metal oxide electrode 40 comprises a layer which is conformal to the underlying elemental metal electrode 36. The cathode 42 can have a thickness of at least about 5 microns, or even at least about 10 microns, or even at least about 50 microns.

Suitable sputtering conditions for depositing the second metal-containing film 46 that is a metal oxide electrode 40, comprise selecting a sputtering target composed of the metal of the metal oxide to be deposited and mounting the target in a sputtering chamber such as the chamber shown in FIG. 8; introducing a sputtering gas, such as for example a oxygen-containing gas and/or argon, into a sputtering chamber at a flow rate of from about 50 to about 300 sccm; maintaining a sputtering gas pressure of from about 1 mTorr to about 15 Torr, or even from 5 mTorr to about 10 mTorr; and forming a plasma from the sputtering gas by charging electrodes in the sputtering chamber with an AC or DC current at a power level of from about 10 W to about 5 KW for from about 1 to 10 minutes.

In another method, a metal oxide electrode 40 is deposited by selecting a sputtering target composed of the desired metal oxide material to be deposited and mounting the target in the sputtering chamber; introducing a sputtering gas, such as for example argon, into a sputtering chamber at a flow rate of from about 50 to about 300 sccm; maintaining a sputtering gas pressure of from about 1 mTorr to about 10 Torr; and forming a plasma from the sputtering gas by charging electrodes in the sputtering chamber with an alternating current (AC) or radio-frequency (RF) plasma sputtering at a power level of from about 10 W to about 5 KW for from about 1 to 10 minutes. For example, a metal oxide electrode 40 composed of lithium cobalt oxide can be formed by alternating current (AC) or radio-frequency (RF) plasma sputtering at a frequency of from about 40 k Hz of a target comprising lithium and cobalt in a reactive gas environment, for example oxygen gas, introduced into the chamber at a flow rate of from about 10 to about 100 sccm and maintained a pressure of from about 1 mTorr to about 15 m Torr, or by other conventional methods.

In yet another version, a high efficiency cathode 42 is formed directly on the cathode current collector 38 without any intervening layers. A high efficiency cathode 42 Is one that is capable of reaching the theoretical value of the battery capacity for given thickness and area of the cathode 42. For example, the theoretical value of the battery capacity is about 1.2 mAh for a cathode 42 comprising lithium cobalt oxide in an area of about 2.9 $cm^2$ and a thickness of about 6 micrometers. However, conventional cathodes 42 having the same dimensions and which are deposited without annealing typically only reach a battery capacity of 0.5 mAh at 0.1 mA discharge current. In contrast, a similarly sized, high efficiency cathode 42 fabricated according to the processes described herein can reach higher battery capacity of 1 mAh at 0.1 mA discharge current.

The higher efficiency cathode 42 can be obtained by conducting an annealing process after deposition of the cathode 42 to heat treat the deposited cathode material. The annealing process can be conducted directly in the sputtering chamber 100 or in a separate annealing chamber (not shown) having a heater to heat the battery support 24, cathode current collector 38 and overlying cathode 42. The annealed cathode efficiency is related to the annealing temperature with higher annealing temperatures generating better internal cathode microstructures, which in turn, provides a cathode with a higher efficiency. However, the higher annealing temperatures can also cause higher residual stress in the annealed battery cell 22 which can damage the battery cells 22 or partially oxidize the underlying cathode current collector 38.

In one version, after deposition of the cathode 42, an annealing step can be performed at temperatures of from about 300° C. to about 600° C., or even from about 300° C. to about 400° C. A thick cathode 42 having a thickness of at least about 10 microns can be deposited using the above-described sputtering conditions in a sputtering process conducted for at least about 300 minutes. Conversely, a thin cathode 42 having a thickness of less than about 5 microns can be deposited using the above-described sputtering conditions in a sputtering process conducted for less about 60 minutes.

It was also discovered that, during annealing, an oxygen-containing environment can provide a higher efficiency cathode as the oxygen content in the crystallographic structure of the cathode is related to higher battery charge capacity. For example, a high efficiency cathode 42 formed by annealing a cathode 42 overlying a cathode current collector 38 composed of platinum, at higher temperatures in oxygen containing environments. However, when the cathode 42 is annealed in oxygen-containing environment and the cathode current collector 38 underlying the cathode 42 is made of a metal other than platinum, a thin interfacial oxide layer forms at the annealing conditions even though bulk oxidation does not occur at these temperatures. The thin oxide layer, which is formed at the interface of the cathode 42 and the cathode current collector 38, undesirably increases the internal resistance of the battery cell 42. As result, the charge capacity of the battery cell 22 decreases as the thin interfacial oxide layer interferes with the migration of battery-charge-holding metal species through the oxide layer.

For the foregoing reasons, when the cathode current collector 38 is made from one of the selected materials as described above namely, molybdenum, nickel, tungsten, titanium, chromium, and tungsten—it was found that annealing the overlying cathode 42 in a non-oxygen-containing environment (which was substantially absent oxygen-containing species such as oxygen) substantially improved battery performance. In one version, the annealing process is performed in an inert gas environment, such as argon, helium or neon. In this version, the partially built battery cell 22 having a cathode current collector 38 composed of molybdenum, nickel, etc., is placed in a sputtering or annealing chamber and heated while inert gas is flowed into the chamber. For example, the volumetric flow rate of the selected inert gases can be from about 10 to about 10,000 sccm.

The annealing temperature set in the sputtering or annealing chamber depends upon the cathode current collector material being used. For example, when the cathode current collector 38 is made from molybdenum or tungsten, the cathode annealing step can be carried out at temperatures lower than 400° C., or even from about 300 to about 400° C., and in an inert gas environment comprising argon, to inhibit the formation of surface oxide which deteriorates the conductivity of a battery cell 22. As another example, when the cathode current collector 38 is made from nickel or titanium, the cathode annealing step can be carried out at temperatures lower than 400° C., or even from about 300 to about 350° C., and in an inert gas environment comprising argon, to inhibit the formation of surface oxide which deteriorates the conductivity of a battery cell 22.

In yet another version, the efficiency of the cathode 42 is further increased by depositing the cathode 42 using a sputtering plasma which is generated by applying a high power level current to a magnetron cathode 72 in a sputtering chamber 100 (as shown in FIG. 8). It was discovered that such a high power density plasma facilitated deposition and formation of a higher efficiency cathode 42, without having to a meal the deposited cathode material at excessively high annealing temperatures or in oxygen-containing environments. The high efficiency cathode 42 can be deposited using a sputtering plasma generated at a high cathode deposition power density by applying an electrical power of at least about 0.5 kW, or even at least about 2.5 kW, to the magnetron cathode. After deposition of the high efficiency cathode 42, an annealing step is performed on the deposited cathode 42 directly in the sputtering chamber 100 to heat the underlying cathode current collector 38 to temperatures of from about 25 to about 600° C. in an argon gas environment provided at a flow rate of from about 1 to about 100 sccm. The annealing process can also be conducted in a separate annealing chamber.

Figure 4A:
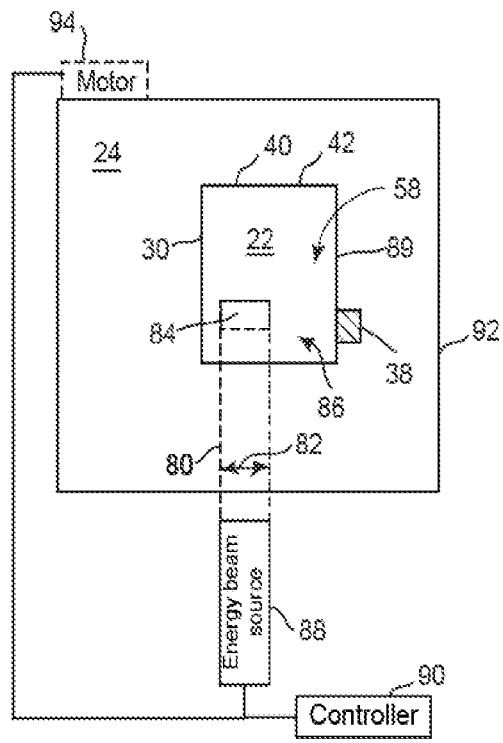
FIG. 4A is a schematic top view diagram of an energy beam source heating a metal oxide electrode layer and being reflected from an underlying elemental metal electrode layer.
Figure 4B:
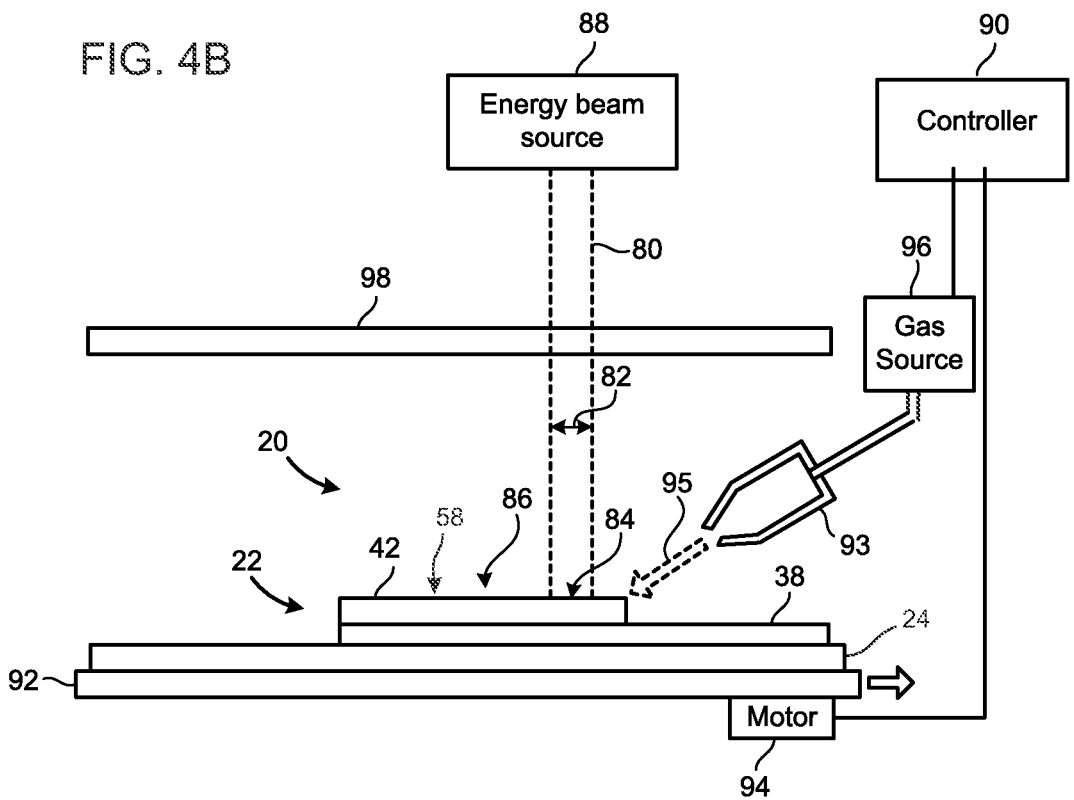
FIG. 4B is a schematic side view diagram of the energy beam source of FIG. 4A.

After deposition of one or more battery component films 30, an overlying battery component film 30 is heat treated by annealing in a tube oven or locally heat treated by directing an energy beam 80 onto a beam incident area 84 on a top surface 58 of the battery component film 30, as illustrated in FIGS. 4A and 4B. In the exemplary illustration, the second metal-containing film 46 overlying the first metal-containing film 32 is heat treated. The second metal-containing film 46 is a metal oxide electrode 40, such as for example, a cathode 42. The energy beam 80 provides localized heating of a beam incident area 84 of the second metal-containing film 46 comprising the metal oxide electrode 40 without excessively heating adjacent regions 86 or the underlying first metal-containing film 32 which is an elemental metal electrode 36, such as a cathode current collector 38

The energy beam 80 locally heats a beam incident area 84 on the overlying second metal-containing film 46 (or cathode 42) without excessively heating the underlying first metal-containing film 32 (or cathode current collector 38). The fluence of the energy beam 80 is the radiation flux integrated over time, and is a measure of the energy delivered per unit area in units of $J/m^2$. For example, for an energy beam 80 of electromagnetic radiation, such as a pulsed laser beam, which has a pulse peak power, pulse duration, and a beam incident area 84 comprising a focal spot area, the fluence can be calculated as follows:

Fluence($J/m^2$)=laser pulse energy(J)/focal spot area;

where the laser pulse energy (J)=peak power (W)/pulse duration (s).

For example, a suitable fluence for an energy beam 80 to heat the cathode 42 to a temperature which is at least 100° C. higher than the temperature attained by the cathode current collector 38 is at least about 10 $J/cm^2$, or even at least about 200 $J/cm^2$, or even from about 50 to about 100 $J/cm^2$. These levels of fluence were found to heat the cathode 42 to a temperature of at least 400° C., or even a temperature of from about 400 to about 700° C., while the peak temperature simultaneously attained by the cathode current collector 38 during the local heating process is maintained at less than 300° C. In one version, the underlying first metal-containing film 32 is heated to temperatures of less than 300° C. to avoid excessive heating of the underlying film to heat treat the metal oxide electrode 40 substantially without thermally degrading or oxidizing the underlying elemental metal electrode 36. The fluence of the energy beam 80 is selected by setting a power level and scanning speed of the energy beam 80, as described below.

In one version, the energy beam 80 is selected to have heating properties that selectively heat the upper or overlying battery component film 30 without excessively heating the underlying battery component film 30. For example, the energy beam 80 can be selected to have a linear attenuation coefficient in the overlying battery component film 30, which can be a metal-containing film such as the metal oxide electrode 40, of at least about $5 \times 10^{-4}$. The measured intensity I of an energy beam 80 transmitted through a battery component film 30 having a thickness x is related to the incident intensity $I_0$ according to the inverse exponential power law that is usually referred to as Beer-Lambert law $I = I_0 e^{-\alpha x}$ where x denotes the path length of the energy beam 80 through the film thickness. The linear attenuation coefficient, α, describes the extent to which the intensity of the energy beam 80 is reduced as it passes through the thickness of the overlying battery component film 30, or in this case, the second metal-containing film 46. By selecting an energy beam 80 which has the desired linear attenuation coefficient in an overlying battery component film 30, the amount of energy transferred to the underlying battery component film 30, such as the first metal-containing film 32, is reduced to less than about 10% or even less than about 5%. This prevents heat build up in the underlying film, and consequently, allows the underlying film to remain at lower temperatures.

In still another version, the energy beam 80 is selected to have a Half Value Layer (also half-value thickness) in the overlying battery component film 30 of at least about 1 microns. The Half Value Layer is the thickness of the battery component film 30, or in this case the second metal-containing film 46, which reduces the intensity of radiation entering the material by half. By selecting an energy beam 80 which has a particular Half Value Layer in the overlying battery component film 30, the amount of energy transferred to the underlying battery component film 30, which is also the first metal-containing film 32, is reduced to less than 50% or even less than 10%. This further prevents heat build up in the underlying film, and consequently, allows the underlying film to remain at lower temperatures while the overlying film is being heated.

In yet another version, the energy beam 80 comprises an electromagnetic beam, and is selected to have a reflection coefficient from the underlying film of at least about $5 \times 10^{-4}$. The reflection coefficient is the ratio of the amplitude of the reflected wave from the underlying battery component film 30 to the amplitude of the incident wave that reaches the interface at the underlying battery component film 30 after traveling through the overlying battery component film 30. For example, when the underlying battery component film is the first metal-containing film 32 and the overlying battery component film 30 is the second metal-containing film 46, then the reflection coefficient is the ratio of the amplitude of the reflected wave from the underlying metal-containing film to the amplitude of the incident wave that reaches the interface of the first and second metal-containing films 32, 46. The larger the reflection coefficient, the less radiation incident on the underlying film is absorbed by the underlying film to increase its temperature. Thus, it is desirable for the underlying film to have a high reflection coefficient to reduce the temperature of this film during heat treatment, and consequently, reduce thermal degradation of the film.

The energy beam 80 also has a beam width 82 selected in size to cover and heat a beam incident area 84 on the battery component film 30, which can be the second metal-containing film 46 or metal oxide electrode 40, without excessively heating adjacent regions 86 or adjacent battery component films. In one example, the energy beam 80 has a beam width 82 that is sized less than about 2000 microns, for example, from about 100 to about 1000 microns. In contrast to conventional heat treatment techniques in which the entire partially fabricated battery cell 22 is heated up in an oven, the localized heat treatment of a battery component film 30 with an energy beam 80 having a controlled beam width size and power level allows heating of a single overlying battery component film 30 without excessively heating adjacent regions 86 or underlying battery component films 30.

The localized heat treatment process can have diverse applications depending on the nature of the battery component film 30. For example, it is believed that the heat treatment process using the localized energy of the energy beam 80 anneals a battery component film 30 to reduce stresses, reduce the number of lattice defects, and/or even alter the crystallographic properties of the film. For example, a suitable heat treatment can induce changes in both crystal size and crystallographic preferred orientation in metal-containing films. As an example, when a metal-containing film comprising a metal oxide electrode 40 is heat treated, the heat treatment increases the electrical conductivity of the metal-containing oxide film by altering its crystallographic properties to improve the electrical properties of the electrode 40. It is particularly desirable to heat treat a metal oxide electrode 40 that serves as a cathode 42, when the cathode 42 is a thick layer deposited in a sequence of deposition process steps to build up the thickness of the cathode 42. The thicker cathode 42 has a thickness of at least about 4 microns, and serves to provide better cathode efficiency.

Still further, when a selected energy beam 80 such as a $CO_2$ laser beam is scanned across a cathode 42 at room temperature, the metal oxide material of the metal oxide electrode 40 has a higher absorbance rate of the $CO_2$ laser beam than the underlying elemental metal material of the elemental metal electrode 38. While the metal oxide cathode absorbs more than 90% of the incident energy of the $CO_2$ laser beam to heat up this layer, the underlying elemental metal layer nearly totally reflects the $CO_2$ laser beam without substantially changing temperature. The localized temperature increase in the overlying metal oxide layer transfers some heat to the underlying elemental oxide layer, but the underlying metal layer is isolated from the ambient environment by the overlying metal oxide layer and thus protected from oxidation for small temperature rises, and the pulse of transferred heat is localized and short, further limiting heat build-up. The localized heating of the overlying metal oxide layer 40 thus does not substantially increase the temperature of the underlying layer nor cause oxidation of the underlying metal.

As another example, the heat treatment process using localized energy of the energy beam 80 can also be used to heat treat a metal-containing film such as an elemental metal electrode 36, for example the cathode current collector 38 or anode current collector 50. Similarly, the anode current collector 50 can also be heat treated after deposition of this film. For example, a cathode or anode current collector 38, 50 comprising platinum can be heat treated to improve its crystalline properties. As one example, the energy beam 80 can be maintained at a sufficiently low power level to heat the beam incident area 84 on the elemental metal electrode 36 to a temperature of at least about 200° C., or even a temperature of at least about 400° C. Other battery component films 30 can also be heat treated using the energy beam 80, as would be apparent to those of ordinary skill in the art, and heat treatment of these films are included in the scope of the present application.

In the localized heat treatment process, an energy beam source 88 generates an energy beam 80 that is raster scanned across an entire top surface 58 of the battery component film 30 in a pattern that matches the shape and profile of the battery component film 30. In the example shown, the energy beam 80 is shown as being scanned across a battery component film 30 comprising a metal-containing film that is a metal oxide electrode 40, such as a cathode 42. However, the energy beam 80 can be scanned or otherwise moved across any of the battery component films 30 described herein, especially metal-containing films which can improve in electrical properties with heat treatment, or other battery component films 30 as would be apparent to those of ordinary skill in the art, using the same apparatus and methods of operation.

During scanning, the energy beam 80 can be manually operated or controlled by a controller 90 which controls the power applied to the energy beam source 88 and the motion of a movable stage 92 capable of moving the battery 20 during localized heating by the energy beam 80. The movable stage 92 can be a table that can be moved in the x and y directions by a stage motor 94 controlled by the controller 90. The movable stage 92 and controller 90 can include interpolative program code to enable movement of the table in the x-y plane using velocity or even acceleration vectors. In one embodiment, the movable stage 92 can be set to provide different vectorial velocities, for example from about 0.1 to about 400 mm/s, or even from 2 mm/sec to about 10 mm/sec. In another embodiment, the vectorial acceleration of the stage can be set with levels ranging from about 0.5 to about 50 mm/sec$^2$, for example, at 0.8, 4, 20, and 40 mm/sec$^2$. In one version, the movable stage 92 is capable of being positioned to an accuracy of greater than about 12 microns. A low power laser (not shown) can also be used to indicate the position of the energy beam 80 on the battery 20, such as for example, a He—Ne laser. The heating and scanning process can be carried out by either moving the energy beam or sample stage. The energy beam localized heating process can be conducted in a chamber, such as a dry box or even a clean room or dry room.

In still another process version, while a battery component film 30 such as a metal-containing film, for example a metal oxide electrode 40, is locally heated by the energy beam 80, a gaseous environment is maintained about the battery component film 30 to promote heat treatment. For example, an oxygen-containing gas can be maintained about a metal-containing film, such as a metal oxide electrode 40, for example the cathode 42, during heat treatment of this film. The oxygen-containing gas assists in reducing any lattice or other defects present in the as-deposited metal oxide electrode 40 or cathode 42. For example, the oxygen-containing gas can result in the film having a post heat treatment stochiometric composition that is closer to ideal by causing oxygen diffusion into the metal oxide electrode 40. Still further, the oxygen-containing gas can also increase the oxygen content in the annealed crystallographic structure of the metal oxide electrode 40 which improves the electrical characteristics of the electrode. However optimal annealing temperatures of from about 400 to about 750° C. can cause a thin oxide layer to form on metals other than noble metals at the annealing conditions, and bulk oxidation at higher temperatures. Thus annealing the metal oxide electrode 40 can increase the internal resistance of the battery cell 22 due to formation of a thin oxide layer in the oxygen-containing ambient atmosphere. The localized heating using the energy beam 80 avoids or entirely eliminates oxidation of the underlying layer.

A suitable oxygen-containing gas comprises oxygen, air, or other oxygen-containing gases. In one version, a suitable flow rate of the oxygen-containing gas, such as air or oxygen is introduced into a chamber, while the energy beam 80 is directed onto the battery component film 30, such as the metal-containing film which is a metal oxide electrode 40. For example, an oxygen-containing gas comprising oxygen can be introduced into the chamber (not shown) at a suitable flow rate. In still another version, a gas nozzle 93 is used to blow a gas stream 95 of an oxygen-containing gas onto the localized heating area 84 of the metal oxide electrode 40 during heat treatment, as for example, shown in FIG. 4. In still another version, air can be maintained at atmospheric pressure about the metal oxide electrode 40 to create an oxygen-containing environment about the metal oxide electrode 40 during heat treatment (not shown).

In one version, the energy beam 80 comprises a laser beam 101 generated by an energy beam source 88 that is a laser beam source 103. The laser beam source 103 is selected to generate the laser beam 101 at a sufficiently high power level to heat up the battery component film 30 when incident thereon without damaging underlying films 30. A suitable laser beam source 103 can generate a laser beam 101 having a wavelength in the ultra-violet (UV), visible, infrared (IR) or partial IR ranges, such as a range of from about 0.2 to about 50 microns. The laser beam source 103 can provide a laser beam 101 that is continuous or pulsed. In the continuous beam version, the laser beam source 103 generates a continuous laser output having a steady state equilibrium. An exemplary laser beam source 103 comprises a carbon dioxide laser. An exemplary embodiment of a carbon dioxide laser provides a laser beam 101 having a wavelength of from about from about 1 to about 100 microns, or even from about 10 microns to about 11 microns. A suitable carbon dioxide laser comprises a CB0805-30 available from Han's laser, Newberg, Oreg. 97132, USA. A continuous laser beam can also be generated by an ultraviolet laser providing a laser beam 101 having a wavelength of from about 100 to about 400 nm. An exemplary ultraviolet laser comprises a Hawk-II available from Quantronix, East Setauket, N.Y.

The laser beam source 103 can also generate a laser beam 101 that is a pulsed beam. In this version, the laser beam source 103 generates a laser beam 101 comprising pulsed laser bursts which have an output energy having a series of energy spikes that may be partially overlapping or entirely separated in time. For example, in one embodiment, a laser beam source 103 is programmed to provide laser beam bursts of ultraviolet light at a power level of from about 0.2 to about 1 watts, and with a duration of from about 40 to about 160 nanoseconds. These pulsed bursts can be provided at a pulse rate of from about 5 to about 200 Hz. The pulsed laser bursts can be moved across the battery support with a vectorial velocity of from about 0.1 to about 10 mm/s.

In another example, an energy beam comprising femtosecond pulsed laser beam 101 was set to provide an irradiance level of from about 10 to about 200 J/cm2, and pulsed laser bursts having a pulse duration of from about 10 to about 1000 femtoseconds, for example, about 150 femtosecond. Based on this pulse duration, the fluence level of the femtosecond pulsed laser beam 101 was calculated to be from about 10 to about 200 J/cm2. The pulse can be set to be from about 100 microjoules to about 2000 millijoules, in one example, about 500 microjoules. The pulse repetition rate should also be set to provide good cutting, and in one example, the pulse repetition rate was set to be from about 50 to about 1000 Hz, for example, about 125 Hz.

During localized heat treatment with the energy beam, a gas nozzle 93 can also be used to blow a gas stream 95 of a blowing gas onto the localized beam incident area 84 on the cathode 42 to remove any debris or vapors from the localized heating area. The gas nozzle 93 obtains the blowing gas from a gas source 96 and the gas flow rate can be controlled by a mass or volumetric gas flow controller. The blowing gas can be an inert gas such as argon or helium, nitrogen, or a mixture of such gases, and the pressure of the gas can be, for example, at least 2 Kg/cm$^3$. In one version, the blowing gas comprises argon to maintain an inert gas environment around the cathode 42 being heat treated. In another version, the blowing gas comprises an oxygen-containing gas such as oxygen or air, to maintain an oxygen-containing environment around the metal oxide electrode 40 being heat treated.

Figure 5:
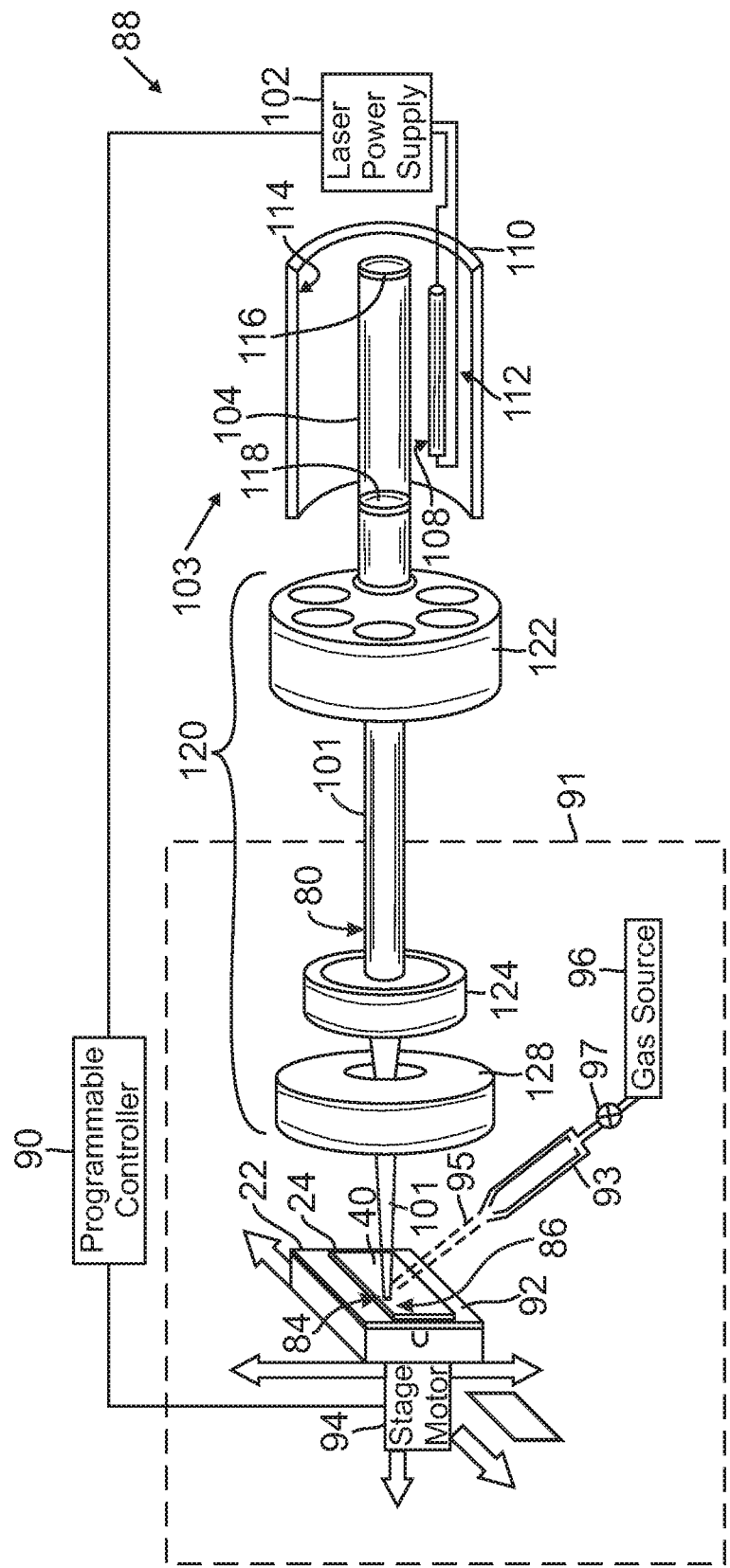
FIG. 5 is a schematic diagram of an embodiment of a laser beam apparatus capable of locally heating the battery component film.

A schematic diagram of an embodiment of an energy beam source 88 comprising a laser beam source 103 capable of locally heating a battery component film 30 of a battery cell 22 is illustrated with reference to FIG. 5. The laser beam source 103 is positioned above a movable stage 92 and is powered by a laser power supply 102 to generate a laser beam 101 that is directed onto the battery component film 30 of the battery 20 to locally heat a beam incident area 84. An exemplary laser beam source 103 that can provide pulsed laser bursts comprises a lasing medium 104 and laser light source 108 positioned at the twin focal points of a light resonator 110. The lasing medium 104 can be a solid-state rod material such as a titanium doped sapphire, Nd:YAG, a chromium ion doped ruby; or a gas laser which uses a combination of an inert gas and reactive gas to generate the laser beam 101. The light resonator 110 comprises an elliptical cavity 112 having reflective surfaces 114 which reflect photons emitted from the light source toward the lasing medium 104. These photons resonate in the lasing medium 104 between a highly reflective mirror 116 and a partially reflective output coupler 118 at either end of the lasing medium 104. The generated laser beam 101 is emitted through the partially reflective output coupler 118. The composition and concentration of the lasing medium 104, and the construction of the elliptical cavity 112 of the light resonator 110, mirror 116, and coupler 118, are optimized for continuous or pulsed laser operation.

An exemplary version of the laser beam source 103 is a carbon dioxide laser operated at a power level of about 30 watts in a continuous laser beam mode (not pulse). The laser beam 101 is directed onto the battery component film 30 of a battery cell 22 on a support 24 which is placed on a movable stage 92 comprising a table that can be moved in the x and y directions by a stage motor 94 that is a synchronous or step motor. The stage motor 94 can operate in a grill or cellular system to provide a scanning speed of from about 0.1 to about 300 mm/sec across the support 24 and with a repeat accuracy of about ±0.03 mm. The controller 90 operating the motor 94 of the movable stage 92, can be for example, a WIN2000 industrial computer with program code to enable movement of the stage 92 in the x-y plane using velocity or even acceleration vectors. The apparatus has a 6 inch diameter vent and uses an air cooler for cooling. The apparatus operates with a power requirement of about 1.5 KW.

The continuous laser beam 101 generated by the laser beam source 103 is passed through a laser optical system 120 which comprises a neutral density filter 122, one or more focusing lenses 124, and a shutter 128. The neutral density filter 122 reduces the intensity of all wavelengths or colors equally. The focusing lens 124 can have a focal length of from about 1 cm to about 20 cm, such as for example, 10 cm. In the continuous laser beam mode, the shutter 128 is either not present or, if present, the shutter 128 kept open to allow the laser beam 101 to pass through the open shutter without interruption. In the pulse laser beam mode, the shutter 128 is operated to rapidly open or close. By opening and closing rapidly, the shutter 128 can generate a laser beam 101 having laser pulses with pulse durations in nanoseconds or femtoseconds. The shutter 128 can be a mechanical shutter, mode locking shutter, or electro-optical shutter.

In another version, the energy beam 80 comprises an ultrasonic energy beam 130 generated by an energy beam source 88 that is an ultrasonic beam source 132, as shown in FIG. 6. The ultrasonic beam source 132 is selected to generate the ultrasonic energy beam 130 at a sufficiently high power level to heat treat the battery component film 30 when incident thereon. A suitable ultrasonic beam source 132 capable of generating an energy beam 80 is an ultrasonic energy beam 130 having a frequency of from about 1 KHz to about 100 MHz. A suitable ultrasonic beam source 132 is 2000X Ultrasonic Assembly System available from Branson Ultrasonics Corporation. These ultrasonic apparatus can operate at a frequency of 20 kHz with a power output rating of 1250, 2500, and 4000 Watts; at a frequency of 30 kHz with a power output rating 750 and 1500 Watts; and at a frequency of 40 kHz with a power output rating of 400 and 800 Watts. There is no warm-up time and no need for constant temperature maintenance.

In yet another version, the energy beam 80 comprises a thermal energy beam 140 generated by an energy beam source 88 that is a thermal energy beam source 142, as shown in FIG. 7. The thermal energy beam source 142 is selected to generate the thermal energy beam at a sufficiently high power level to heat the battery component film 30 when incident thereon. A suitable thermal energy beam source 142 and generate a thermal energy beam 140 having a thermal energy flux of from about 0.1 to about 5 J/mm$^2$. A suitable thermal energy source 142 comprises a point thermal sealer linear thermal sealer, micro halogen light system, and micro blowtorch. The thermal energy beam 140 also provides localized heating of the beam incident area 84 without heating adjacent regions 86.

After heat treatment of the metal oxide electrode 40, an electrolyte 44 is deposited over the metal oxide electrode 40. For lithium batteries, the electrolyte 44 can be, for example, an amorphous lithium phosphorus oxynitride film, also known as a LiPON film. In one embodiment, the deposited LiPON material has the stochiometric form $Li_xPO_yN_z$ in an x:y:z ratio of about 2.9:3.3:0.46. In one version, the electrolyte 44 has a thickness of from about 0.1 microns to about 5 microns. This thickness is suitably large to provide sufficiently high ionic conductivity and suitably small to reduce ionic pathways to minimize electrical resistance and reduce stress. The electrolyte 44 can be formed by RF sputtering of target material comprising lithium and phosphorous in a reactive gas environment, for example oxygen gas. A suitable sputtering process uses a sputtering target composed of $Li_3PO_4$, a sputtering gas comprising nitrogen at a flow rate of from about 50 sccm to about 500 sccm, a pressure of from about 1 mTorr to about 20 mTorr, and a plasma formed by applying a RF current to the magnetron 72 at a power level of from about 0.5 KW to about 5 KW. An electrolyte 44 having a thickness of at least about 2 to 3 microns can be deposited using the above-described sputtering conditions in a sputtering process conducted for at least about 60 to 100 minutes.

Another metal-containing film 32 comprising an elemental metal electrode 36 is then formed on the electrolyte 44, to serve as an anode current collector 50. The second elemental metal electrode 36 can be made from the same material as the first elemental metal electrode 36, as already described. A suitable thickness of a second elemental metal electrode 36 is from about 0.1 microns to about 20 microns. In one version, the second elemental metal electrode 36 is made from lithium which is sufficiently conductive to serve as the anode current collector 50, and in this version, the anode 48 and anode current collector 50 are made of the same material. In another version, the anode current collector 50 is made from the same material as the cathode current collector 38 to provide a conducting surface from which electrons can be dissipated or collected from the anode 48. For example, the anode current collector 50 can be made from a non-reactive metal such as silver, gold, platinum, in a thickness of from about 0.05 microns to about 5 microns. In still another example, an anode composed of copper can be deposited by sputtering processes using a sputtering target composed of copper provided in the sputtering chamber 100; using a sputtering gas comprising argon maintained at a pressure of from about 1 mTorr to about 20 mTorr; a plasma power level of from about 200 W to about 2 KW; and a deposition time of from about 5 to about 60 minutes. The anode current collector 50 has a thickness of from about 0.05 microns to about 5 microns. The non-reactive metal can be deposited by conventional sputtering or PVD methods or by electroplating. The elemental metal electrode 36 comprising an anode current collector 50 can also be heat treated after deposition, using the energy beam 80, as described herein.

The anode 48 is formed on, or even abutting and directly over, the electrolyte 44 to receive electrons released by lithium ions that migrate through the electrolyte 44. The anode 48 can be a lithium-containing material which can be elemental lithium or a lithium compound, or a conducting metal such as copper. In one version, anode 48 is made from elemental lithium which is sufficiently conductive to serve as the anode current collector 50 allowing both the anode 48 and anode current collector 50 to be made of elemental lithium. The anode 48 can also be composed of the same material as the cathode 42, as previously described. A suitable thickness of the anode 48 is from about 0.1 microns to about 20 microns. The anode 48 can also be permeable as for example described in U.S. Pat. No. 6,713,987, entitled "RECHARGEABLE BATTERY HAVING PERMEABLE ANODE CURRENT COLLECTOR", filed on Feb. 28, 2002, which is incorporated herein by reference in its entirety. The anode 48 can extend to cover the entire area of the cathode 42 or terminate short of the cathode area to provide reduced electrical shorting at the anode edges.

After fabrication of one or more battery cells 22 on a support 24, a protective casing 21 is fabricated to protect the battery cells 22 from degradation in the external environment. In one version, the protective casing 21 comprises a sealant 52 which is applied to extend across at least one, a plurality of, or even substantially the entire length of (or all of) the open peripheral side surfaces 54 along a perimeter 56 of battery 20, as shown in FIGS. 1A, 1B and 2C. The perimeter 56 of the battery confines the battery cells 22 therein, and the open peripheral side surfaces 54 are those surfaces which are vertical relative to the planar top surface 26 of the support 24 and extend around the perimeter 56. It should be understood that while the sealant 52 is shown as extending around the perimeter 56 of a battery 20 comprising a single battery cell 22, the sealant 52 can enclose individual battery cells 22 or a plurality of battery cells 22 of a multi-cell battery 20. The sealant 52 can also extend to cover an exposed battery top surface 74. In both versions, the sealant 52 is applied to a thickness of less than 60 microns, for example, from about 20 to about 50 microns. In the version shown a portion of the cathode current collector 38 and part of the anode current collector 50 extend outside of the sealant enclosed area to serve as the terminals 25a,b, respectively, for connecting the battery 20 to the external environment. A suitable sealant 52 can be composed of a thermoplastic or thermoset polymer, epoxy, or other materials.

Thereafter, a cap 60 which forms another portion of the protective casing 21, is positioned on top of, or spaced apart from, the polymer 52 to cover the battery cell 22, and laminated to the battery cell 22. In one version, the cap 60 is a rigid plate of a ceramic material, a metal foil, or a metal coated plastic film, or a plurality of ceramic and polymer films which are conformal to the shape of the battery. Suitable ceramic tools include aluminum oxide or diamond-like carbon (DLC), and a suitable composition of the polymer comprises polymer, epoxy, or even a thermoset or thermoplastic polymer. The cap 60 can also be made from the same material as the support 24. The cap 60 can have a thickness of less than 50 microns, for example, from about 7 to about 40 microns. After placement, a pressure is applied to press the cap 60 and the support 24 together to squeeze the polymer 52 therebetween. A suitable pressure may be 3 psi, or even from about 3 to about 60 psi, for example, about 10 psi. The laminating process can be conducted in air or in a non-reactive gas environment, such as argon or nitrogen. A vacuum can also be pulled on the partially fabricated battery 20 using a vacuum pump to remove trapped air and form a better laminate of the cap 60, polymer 52 and underlying support 24. A suitable vacuum comprises a pressure of from about 10 mTorr to about 10 Torr. While the pressure is being applied, the battery cell 22 can also be heated to cure or to soften the polymer 52, a suitable curing or softening temperature being at least 40° C., or even from about 50 to about 110° C. After curing of polymer 52, the edge portions of the polymer 52 overlying the sections of the cathode current collector 38 and anode current collector 50 that extend beyond the peripheral edge of the battery 20 are peeled off to expose underlying material that serves as the first and second terminals 25a,b, respectively.

After fabrication, one or more batteries 20 each comprising a single battery cell 22 or multiple battery cells 22 are cut out of the support 24. A suitable cutting process can include laser cutting using the previously described laser apparatus set to a higher power level, or by mechanical cutting. Prior to cutting, protective shadow masks (not shown) comprising a plate or polymer can also be used to protect portions of the battery films 30 from subsequent cutting processes. Laser cutting can also be performed using a pulsed laser process, such as a femtosecond laser comprising a diode—pumped solid-state laser with a lasing medium comprising a rod of titanium doped sapphire. In another exemplary embodiment, the pulsed laser source is be an ultraviolet laser such as an excimer or 'excited dimer' laser, which is a chemical laser that uses a combination of an inert gas, such as argon, krypton, or xenon; and a reactive gas such as fluorine or chlorine. Several exemplary laser source and cutting methods are described in U.S. Pat. No. 7,862,627 to Li et al. and co-pending U.S. Patent Publication No. US 2009-0208671 A1 to Nieh et al., both of which are incorporated by reference herein and in their entireties.

The battery component layers 30 that form some of the battery component films 30 of each battery cell 22, including the cathode current collector 38, cathode 42, electrolyte 44, anode 48, and anode current collector 50, can be sputter deposited onto a battery support 24 by sputtering one or more sputtering targets 62 mounted in a sputtering chamber 100 of a sputtering apparatus 97, as shown in FIG. 8. The sputtering chamber 100 comprises a sidewall 109, upper wall 111 which may be a ceiling, and lower wall 113, all of which surrounds and encloses a sputtering zone 115. The chamber sidewall 109 can be electrically isolated from the upper wall 111 and the lower wall 113 and can be electrically grounded. Sputtering gas is introduced into the chamber via gas holes 139 of a gas distributor 126, which is connected to a sputtering gas supply 123 which can include compressed gas cylinders, flow meters, valves, and other flow control equipment. The sputtering gas can contain non-reacting gases that can be energized to form a plasma that ionizes and sputters material from the sputtering targets 62, and/or can also contain reactive gases that react with sputtered material from a sputtering target 62 to form compounds that deposit on the support 24. The chamber 100 can be evacuated to a preset pressure by a gas exhaust 133 comprising one or more vacuum pumps 131 and a throttle valve 134.

A sputtering target 62 comprising a backing support 70 supporting a lithium-containing sputtering member 64 is fastened in the sputtering chamber 100 opposing and facing a support carrier 105. The sputtering target 62 is positioned abutting a magnetron 72, which generates a magnetic field about the surface of the sputtering target 62 to provide a more uniform and continuous bombardment of the target 62 with sputtering plasma ions during the sputtering process. The magnetron 72 contains one or more magnets 74, and can be internally mounted inside the chamber 100 or externally mounted. A target power source 121 comprising one or more power supplies provides an AC voltage at a voltage level of from about 200V and about 1200V, or even from about 250V to about 450V. The voltage can be provided at a power level of from about 1 kW and about 20 kW, or even from about 3 KW to about 10 KW. The voltage can also be provided at a mid-frequency level of from about 10 to about 100 kHz, or even at a frequency of from about 20 kHz to about 80 kHz.

The sputtering target 62 comprises a lithium-containing sputtering member 64 to deposit a lithium-containing film 31 such as the anode 48 onto a battery support 24 positioned on a support carrier 105. The sputtering member 64 can be rectangular, circular or cylindrical in shape, depending on the shape or configuration of the chamber 100 or battery support 24. For example, the lithium-containing sputtering member 64 can be composed of a lithium compound, such as lithium, lithium oxide, lithium cobalt oxide, or other lithium compounds. The lithium-containing material is selected to obtain the desired composition of a lithium-containing film 31. For example, a cathode 42 of a battery cell 22 can deposited using a lithium-containing sputtering member 64 composed of lithium cobalt oxide having the stochiometric formula $LiCoO_2$. As another example, an electrolyte 44 of a battery cell 22 can deposited using a lithium-containing sputtering member 64 composed of lithium, lithium oxide or lithium phosphate. As still another example, an anode 48 of a battery cell 22 can be deposited using a lithium-containing sputtering member 64 composed of lithium.

A support carrier 105 is transported into the sputtering chamber 100 and positioned facing the sputtering target 62 inside the chamber 100. The support carrier 105 is capable of holding one or more supports 24 so that at least one surface 26 of a single or plurality of supports 24, or both surfaces 26, 27 of one or more supports 24, are exposed to the sputtering zone 115. For example, the support carrier 105 can be a rotating carousel or mechanical conveyor. The support carrier 105 is typically fabricated from plates of a metal such as copper or stainless steel.

In a sputtering process, the sputtering chamber 100 is controlled by a controller 119 that comprises program code to operate and control the various components of the chamber 100 to deposit battery component films 30 on a plurality of battery supports 24 in the chamber 100. The controller 119 comprises, for example, a general purpose computer or control electronic box, which has program code to control the gas supply 123, gas distributor 126, exhaust 130 and throttle valve 134, target power source 121 to apply a power to the sputtering target 62 or magnetron 72, and other chamber components. For example, the chamber 100 can be evacuated to a preset pressure by the gas exhaust 133 to a pressure of less than about $10 \times 10^{-5}$ Torr, prior to introduction of any cleaning or sputtering gas. Thereafter, controlled amounts of cleaning or sputtering gas are introduced into the chamber 100 via the gas distributor 126. For example, a cleaning plasma of an inert gas such as argon can also be used to clean residues from the sputtering target 62 and inner surfaces of the chamber 100.

EXAMPLES

The following examples illustrate annealing effect of heat treating a battery component film 30 such as a second metal-containing film 46 composed of a metal oxide electrode 40 that serves as the cathode 42, and which is deposited over a first metal-containing film 32 composed of an elemental metal electrode 36 that serves as the cathode current collector 38. The examples described herein are illustrative embodiments of the batteries and fabrication methods claimed herein but should not be used to limit the scope of the claims.

In these examples, the battery cell 22 is a solid state lithium battery cell on a support 24 of mica with an electrolyte 44 composed of lithium phosphorus oxynitride, a cathode 42 of lithium cobalt oxide, an anode 48 of lithium, an anode current collector 50 of platinum, and a cathode current collector 38 of either platinum or molybdenum. The battery cells 22 included an adhesion layer 34 of $Li_xCoO_2$ when the cathode current collector was composed of platinum. The cathode 42 was deposited with a high deposition power applied during the sputtering process using deposition process conditions which included a sputtering gas comprising argon and oxygen in a flow rate of from about 100 sccm to about 500 sccm, a gas pressure of from about 5 mTorr to about 15 mTorr, and a plasma formed by applying to the sputtering target magnetron 72 and chamber walls or the support, a current at a power level of from about 0.5 KW to about 10 KW. After deposition of the cathode 42, some of the battery cells 22 are treated in different annealing processes while other battery cells 22 were not annealed. The annealing process conditions are described below.

Example 1

Example 1 compares the performance of solid-state lithium batteries 20 which were heat treated in a tube oven or with localized energy from an energy beam 80 that is a $CO_2$ laser beam, with other batteries which were not heat treated (designated "as-deposited"). The batteries 20 each contained a single battery cell 22 with the same internal battery component films 30, structure, and film thicknesses. The battery cells 22 each had a cathode 42 composed of lithium cobalt oxide and a cathode current collector 38 composed of platinum. The energy capacity of the heat treated and control batteries were measured by discharging the selected battery at a current of 1 mA from a voltage of 4.2 V to a voltage of 3.6 V.

Table I shows comparative test results demonstrating that the energy capacity of a number of batteries 20 having a cathode 42 of lithium cobalt oxide overlying a cathode current collector 38 of platinum, which were heat treated, was significantly higher than the energy capacity of not heat treated batteries. In these examples, the cathode 42 of the battery cells 22 had a thickness of approximately 4.2 microns. The number EFF represents the efficiency of the cathode 42 which is calculated by dividing the measured battery capacity by a theoretical maximum capacity value. It is seen that the EFF values significantly changed from non-heat-treated, as-deposited, EFF values of 30% to EFF values for heat treated batteries of 51% to 61%, a 20% increase in EFF values. Battery capacity increased from a range of from 254 to 284 for the non-heat-treated batteries to a range of from 438 to 522.

ture of the cathode 42. FIG. 9 shows X-ray diffraction plots for a heat treated cathode 42 of LiCoO (labeled 8.2 W 4 mm/s annealed to indicate heat treatment by a laser powered at 8.2 Watts and at a linear movement speed of 4 mm/s) as compared to a non-heat treated, as-deposited cathode 42. The narrower and taller X-ray peak corresponding to $LiCoO_2$ crystals shows much higher levels of crystallization than the broader and smaller non-heat treated X-ray peak. The level of crystallization in the heat treated sample is demonstrated by the shorter lattice parameter (larger diffraction angle) due to ordering structure after annealing and stronger relative intensity of diffracted peaks of $LiCoO_2$ crystal structure.

Example 2

In these examples, solid state lithium batteries 20 that each contained a single battery cell 22 containing a cathode current collector 38 composed of either platinum or molybdenum, underlying a cathode 42 composed of $LiCoO_2$ were tested. In fabrication, after a cathode 42 was deposited over a cathode current collector 38, the cathode 42 was subjected to heat treatment or non-heat treatment including annealed, annealed in air or argon, or annealed using a laser. Thereafter, remaining battery component films 31 were formed on the battery cell 22, and the resultant battery sealed with the protective casing 21. The completely fabricated battery was then charged and tested to determine the battery capacity measured at a discharge current of 1 mA and internal resistance, and from these values the cathode efficiency was calculated as explained above.

FIG. 10 is a graph showing the measurements of battery capacity/internal resistance and cathode efficiency for these batteries. Samples 2A provided a baseline and were batteries 20 containing a battery cell 22 having a cathode current collector 38 composed of platinum (STD-Pt). This cathode deposition process conditions were carried out at lower deposition power as compared to the high efficiency one. Further, after deposition of the cathode 42, the battery cells 22 were annealed in air in a tube oven at an annealing temperature of 560° C. for 10 hours prior to fabrication of the completed battery cell. After annealing, the platinum-containing battery cells 22 increased in battery performance as compared to the subsequently presented baseline un-annealed samples

TABLE I

| Battery Sample | Battery Capacity (microAh) | | | | | | | |
|---|---|---|---|---|---|---|---|---|
| | Capacity Sample 1 | EFF 1 | Capacity Sample 2 | EFF 2 | Capacity Sample 3 | EFF 3 | Capacity Sample 4 | EFF 4 |
| Laser annealed at power 6.7 W, scan speed 4 mm/s | 449 | 52.5% | 438 | 51.2% | | | | |
| Laser annealed at power 7 W, scan speed 4 mm/s | 522 | 61.1% | | | | | | |
| Non-heat-treated (as-deposited) | 284 | 33.2% | 224 | 26.2% | 254 | 29.7% | 258 | 30.2% |

The results of the measured battery capacity values were also consistent with x-ray diffraction data which indicated that after localized heat treatment with the $CO_2$ laser energy beam there were significant changes in the crystalline struc- (marked ASD1-ASD5). The higher annealing temperature of 560° C. increased battery capacity as compared to un-annealed samples the to about 400 microAmps/h at 1 mA discharge current, a $R_{IN}$ of about 140 ohms, and a cathode efficiency of 53%. While these results were good, showing that the cathode current collector 38 of platinum did not oxidize in the atmospheric heat treatment process, use of the platinum was an unavoidable cost.

Samples 2B to 2F were all batteries 20 which contained a battery cell 22 having a cathode current collector 38 composed of molybdenum, and a cathode composed of lithium cobalt oxide. The electrical properties of the samples 2B batteries (marked ASD1-5) were measured without heat treatment of the cathode 42 and in an as-deposited state. These battery cells 22 had an as-deposited high efficiency cathode 42 composed of lithium cobalt oxide deposited using a high deposition power plasma in an inert argon and environment and) a current collector 38 of molybdenum. It is seen that the internal resistance of the batteries 20 varied across a wide range of from about 250 to about 450 ohm, as did the battery capacities which range from 50 to about 280 microamp-hour. As result, the cathode efficiency of these batteries ranged from about 55% to about 70%. These results demonstrated that batteries containing a cathode current collector 38 composed of molybdenum but which did not have a heat-treated cathode 42, provided a wide range of electrical properties with occasionally abnormally low battery capacities.

Samples 2C were batteries 20 containing cathodes 42 which were heat treated at a relatively low temperature of 350° C. in air in an oven for 10 hours prior to fabrication of the completed battery. These samples represented the baseline performance of a battery cell 22 having a high efficiency cathode 42 deposited using a high deposition power plasma in an inert argon and environment and at low annealing temperatures of less than 400° C. The oxygen content in the air caused a thin oxide film to form at the interface of the cathode 42 and the current collector 38 of molybdenum. The deterioration in battery performance is seen in air annealed battery cells 22 as they had a battery capacity of from about to about 1 microAmp-hour, a $R_{IN}$ of about thousands of ohms, and a cathode efficiency of about zero. The battery capacity of these battery cells could not be measured due to the extremely high $R_{IN}$ which was attributed to the oxidation on the surface of cathode current collector 38 composed of molybdenum. This represented a hundred fold decrease in battery capacity, demonstrating that annealing in an oxygen-containing environment of significant deterioration of battery performance. As a result, the cathode efficiency of these batteries 20 even though they contained a cathode current collector 38 of molybdenum was near zero.

Samples 2D were batteries containing cathodes 42 which were heat treated at a temperature of 375° C. in an argon gas environment for 11 hours prior to fabrication of the completed battery cell. The argon flow rate was set at a low flow rate by adjusting a pressure gauge on a compressed tank of argon to 5 psi to provide an estimated flow rate of less than 0.5 liter/min. It is seen that all the electrical properties of these batteries improved compared to the heat treatment in air of Samples 2C, but still varied across wide levels with some measured battery capacities of close to zero. The measured battery capacity, $R_{IN}$, and cathode efficiencies where scattered across a wide range due to partial oxidation of the surface of the molybdenum cathode current collector 38. It is believed that the flow rate of argon allowed some oxygen to permeate into the tube oven causing oxidation of some of the battery cells but not all of them, giving rise to scattered results.

Samples 2E were batteries 20 containing a cathode current collector 38 of molybdenum and a cathode 42 which was heat treated at a temperature of 400° C. in higher argon flow rates for 11 hours. The higher argon flow was obtained by setting the pressure gauge at 10 psi to provide an estimated flow rate of at least about 10 liters/min. The higher argon flow rates were found to protect better protection from oxidation by ambient oxygen to provide battery performance values that were stable and consistent. The higher temperature/high flow argon annealed battery cells 22 provided a battery capacity of from about to about 500 microAmps-hour and a $R_{IN}$ of about 160 ohms. It was seen that all the electrical properties significantly improved and gave cathode efficiencies of 65% and even higher to above 75%. This represented a 3 fold increase in battery capacity over the un-annealed battery cells 22, demonstrating that annealing in an oxygen-containing environment of significant deterioration of battery performance.

Samples 2F were batteries 20 containing a cathode current collector 38 of molybdenum and a cathode 42 which was heat treated using a localized heat treatment with a CO2 laser. The battery cells 221 were annealed by exposing the top surface of the cathode 42 to a carbon dioxide laser beam to locally anneal the cathode 42 in the beam exposed region by generating temperatures of about 400° C. across a beam width of the laser incident on to the cathodes 42. The laser beam was operated at a power level of from 6.7 to 6.8 Watts and raster scanned across the top cathode surface at a linear velocity of 3.5 mm/sec. The laser annealed battery cells 22 provided a battery capacity of from about 550 microAmp-hour at a 1 mA discharge current, a $R_{IN}$ of about 140 ohms, and a cathode efficiency of 79%. Further, the cathode efficiency for high power deposited batteries annealed in a high argon flow was as high as 76% and providing a small variation in range of less than 5%. The battery capacities of these batteries 20 were also the highest having values between 500 and 600 microAmp-hour.

These results demonstrate that the battery 20 comprising a battery cell 22 with a cathode current collector 38 consisting of molybdenum, and an overlying cathode 42 of lithium cobalt oxide, when heat-treated in non-oxidizing environment with for example high argon flow rates are using localized heating with a laser beam, provided the highest cathode efficiencies and a battery capacities.

While illustrative embodiments of the thin film battery 20 are described in the present application, it should be understood that other embodiments are also possible. For example, the locally heating method can be performed by other directed energy sources, such as ultrasonic beam, micro blowtorch, and rapid thermal annealing, as would be apparent to those of ordinary skill in the art. Further, the exemplary methods of fabricating the batteries described herein are provided only to illustrate the present invention, and other methods may be used to fabricate a battery 20 as would be apparent to those of ordinary skill in the art. Furthermore, the materials of the battery components films 30 are also exemplary and may comprise other materials. Also, the battery 20 may have a plurality of battery cells 22 arranged in a convoluted or non-symmetrical shape depending on the application. Thus the scope of the claims should not be limited by the exemplary methods of manufacture, materials and structures provided herein.

What is claimed is:
1. A lithium battery comprising:
  (a) a battery support;
  (b) a cathode current collector directly on and in contact with the battery support, the cathode current collector having a thickness of at least about 0.01 microns;
  (c) a non-oxygen annealed cathode on the cathode current collector, the cathode capable of providing a battery capacity of 1 mAh at a discharge current of 0.1 mA;

(d) an electrolyte on the cathode; and
(e) at least one of an anode or anode current collector on the electrolyte.

2. A battery according to claim 1 which is absent an adhesion layer between the cathode current collector and the support.

3. A battery according to claim 1 wherein the cathode comprises a thickness of at least 50 microns.

4. A battery according to claim 1 wherein the cathode comprises at least one of the following:
   (i) a metal oxide;
   (ii) a lithium metal oxide;
   (iii) at least one of lithium cobalt oxide, lithium nickel oxide, lithium manganese oxide, lithium iron oxide, or a lithium oxide comprising mixtures of transition metals; and
   (iv) amorphous vanadium pentoxide, crystalline $V_2O_5$ or $TiS_2$.

5. A battery according to claim 1 wherein the electrolyte comprises a solid-state lithium-containing layer.

6. A battery according to claim 1 wherein the anode or anode current collector comprises aluminum, platinum, silver or gold.

7. A lithium battery manufacturing method comprising:
(a) providing a support;
(b) forming a cathode current collector directly on the battery support and without an intervening adhesion layer, the cathode current collector composed of molybdenum and having a thickness of at least about 0.01 microns;
(c) depositing a cathode on the cathode current collector, and annealing the cathode in a non-oxygen containing environment, to provide a battery capacity of 1 mAh at a discharge current of 0.1 mA;
(d) forming an electrolyte on the cathode; and
(e) forming an anode on the electrolyte.

8. A method according to claim 7 wherein (c) further comprises scanning an energy beam across the cathode, the energy beam having a fluence of at least about 10 $J/cm^2$.

9. A method according to claim 8 comprising selecting an energy beam having at least one of the following properties:
   (i) a beam width of less than about 1000 microns;
   (ii) an energy beam that is a CO2 laser beam; and
   (iii) a wavelength of from about 1 to about 100 microns.

* * * * *